(12) United States Patent
Kamohara et al.

(10) Patent No.: US 11,665,640 B2
(45) Date of Patent: May 30, 2023

(54) IOT EDGE MODULE

(71) Applicant: RENESAS ELECTRONICS CORPORATION, Tokyo (JP)

(72) Inventors: Shiro Kamohara, Tokyo (JP); Akira Tanabe, Tokyo (JP); Kazuya Uejima, Tokyo (JP); Jun Uehara, Tokyo (JP); Kazuya Okuyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 106 days.

(21) Appl. No.: 17/177,985

(22) Filed: Feb. 17, 2021

(65) Prior Publication Data
US 2022/0264450 A1 Aug. 18, 2022

(51) Int. Cl.
*H04W 52/02* (2009.01)
*H04W 84/18* (2009.01)
*G16Y 30/00* (2020.01)
*G16Y 40/35* (2020.01)

(52) U.S. Cl.
CPC ......... *H04W 52/0216* (2013.01); *G16Y 30/00* (2020.01); *G16Y 40/35* (2020.01); *H04W 52/0248* (2013.01); *H04W 52/0274* (2013.01); *H04W 84/18* (2013.01)

(58) Field of Classification Search
CPC .......... G01R 19/0038; G05F 1/46; G06F 1/26
See application file for complete search history.

(56) References Cited

U.S. PATENT DOCUMENTS

2003/0234038 A1* 12/2003 Kurokami ........... H01L 31/0687
136/255
2019/0369688 A1 12/2019 Tanabe et al.
2020/0309282 A1* 10/2020 Kamohara .......... F16K 31/0675

FOREIGN PATENT DOCUMENTS

CN 103219927 A * 7/2013
CN 111735497 A * 10/2020
JP 2019-208340 A 12/2019

* cited by examiner

*Primary Examiner* — Zhensheng Zhang
(74) *Attorney, Agent, or Firm* — McDermott Will & Emery LLP

(57) ABSTRACT

A microcomputer performs a power supply operation to a wireless communication module at a first time interval set based on a power generation amount at a lowest day power generation amount of a temperature differential power generation module. In addition, the microcomputer performs the power supply operation to a sensor at a second time interval set based on the power generation amount at the lowest day power generation amount of the temperature differential power generation module.

14 Claims, 29 Drawing Sheets

IOT EDGE MODULE

BACKGROUND

It relates to an Internet of things edge modules, for example to a technique enable for the IoT edge module applications used in a smart agricultural system. The internet of things is an IoT.

There are disclosed techniques listed below. [Patent Document 1] Japanese Unexamined Patent Application Publication No. 2019-208340

For example, Patent Document 1 discloses a technique related to a start operation of a microcomputer connected to a power generation device.

SUMMARY

In recent years, the smart agricultural system using IoT-technology has attracted attention.

In this the smart agricultural system, for example, the IoT edge module with built-in sensor such as a temperature sensor or a humidity sensor or a soil moisture sensor will be installed on various soils. The data output from the sensor is transmitted to a data center networked with the IoT edge module by using a wireless communication module built in the IoT edge module. The data center understands the environmental condition of the soil in which the IoT edge module is installed based on the received output data, and calculate growth conditions of the crop optimum for the soil. The calculated optimal crop growth conditions are then transmitted from the data center to the farmer's tablet terminal via the network.

This allows farmers to grow crops at the growth conditions that is optimal for the soil. In this manner, the smart agricultural system can efficiently grow crops. Therefore, the smart agricultural system is expected as a next-generation agricultural technique.

What is essential here is to maintain a power supply for operating the IoT edge module. For example, it is conceivable to use a battery as the power supply of the IoT edge module, but when the amount of power stored in the battery is reduced, the battery needs to be replaced, which increases the cost required for maintenance of this battery. That is, a maintenance-free power source is desired as a power source for operating the IoT edge module.

In this regard, it is also conceivable to use environmental power generation device such as, for example, a solar power generation device or an oscillating power generation device. However, in these power generation devices, it is difficult to stably supply electric power to the IoT edge module over the year. For example, in a solar power generation device, it is difficult to provide power stably, such as not being able to generate power at night or in rainy weather.

Therefore, for example, as the power supply for operating the IoT edge module, it has been considered to adopt a temperature differential power generation module that generates power by utilizing a temperature difference between a temperature of an atmosphere on a ground surface and a soil temperature. However, the temperature differential power generation module needs to be devised to stably operate the IoT edge module throughout the year.

The IoT edge module in one embodiment comprises a microcomputer configured to control the supply of power from the temperature differential power generation module to the wireless communication module and the sensor. Here, the microcomputer includes transistors formed on SOTB (Silicon On Thin Buried Oxide) substrate. Then, the microcomputer is configured to determine a power supply operation to the wireless communication module and the sensor based on a power generation status of the temperature differential power generation module.

The IoT edge module in one embodiment also includes the microcomputer configured to control the delivery of power from the temperature differential power generation module to the wireless communication module and the sensor. The IoT edge module is a component of the smart agricultural system that presents the growth condition of the crop at the location of the IoT edge module. Here, the microcomputer includes the transistors formed on a SOTB substrate. The microcomputer is also configured to determine the power supply operation to the wireless communication module and the sensor based on the power generation status of the temperature differential power generation module.

DETAILED DESCRIPTION

Figure 1:
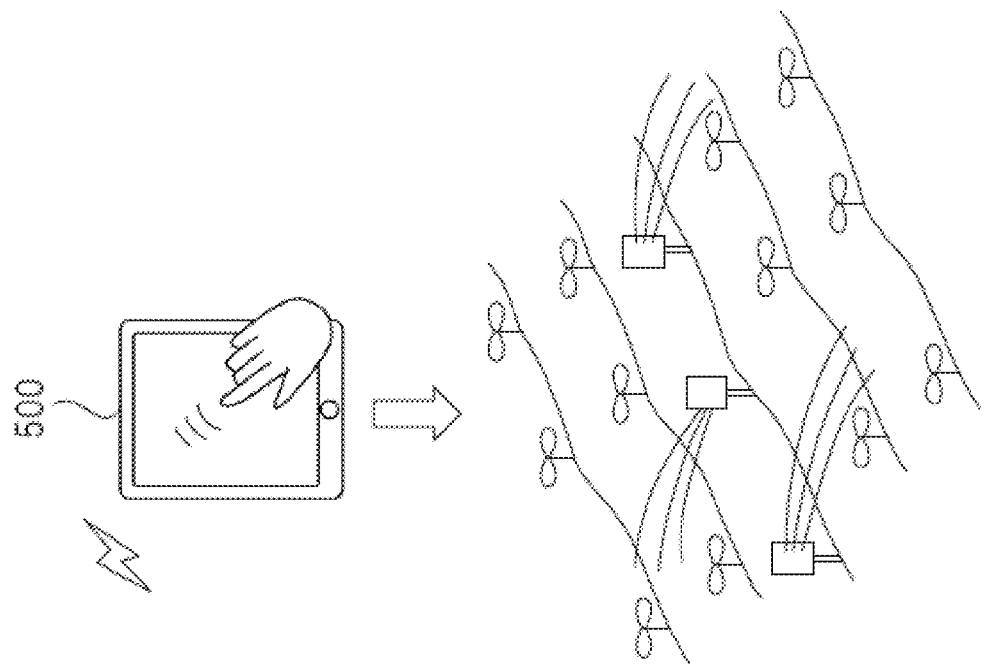
FIG. 1 is a diagram showing an exemplary configuration of a smart agricultural system.
Figure 1:
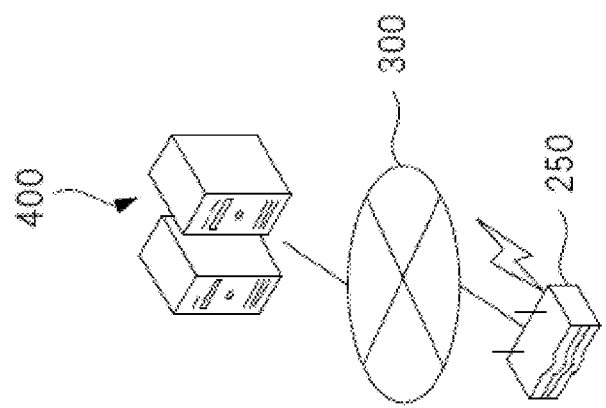
Figure 1:
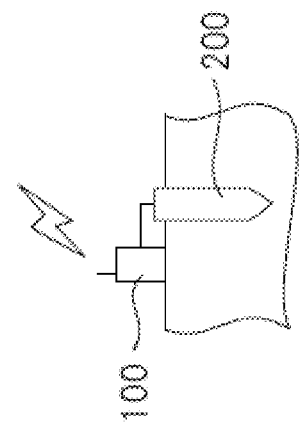

In all the drawings for explaining the embodiments, the same members are denoted by the same reference numerals in principle, and repetitive descriptions thereof are omitted. Note that even plan view may be hatched for the sake of clarity.

<Smart Agricultural System>

While present embodiment illustrates a smart agricultural system as an exemplary system using a wireless sensor network, the technical philosophy of present embodiment can be used in a wide range of systems using wireless sensor networks, not limited to the smart agricultural system.

FIG. 1 is a diagram showing an exemplary configuration of a smart agricultural system.

As shown in FIG. 1, the smart agricultural system includes a IoT edge module 100, a temperature differential power generation module 200, a gateway 250, a network 300, a data center 400, and a tablet terminal 500.

In FIG. 1, the IoT edge module 100 is configured to include one or more sensors, and a wireless communication module for transmitting output data from the sensor, and a microcomputer for controlling operation of the sensors and operation of the wireless communication module. The sensors includes any one or more of a temperature sensor, a humidity sensor, a soil moisture sensor, a pH sensor, and a thermal conductivity measurement sensor. The IoT edge module 100 is electrically connected to the temperature differential power generation module 200 that supplies power to the IoT edge module 100.

The temperature differential power generation module 200 functions as a power source for supplying power to the IoT edge module 100. Specifically, the temperature differential power generation module 200 is configured to generate power by a temperature difference between a temperature of the atmosphere near the ground surface and a soil temperature. For example, the temperature differential power generation module 200 is comprised of the seebeck element. The power generated by this temperature differential power generation module 200 is supplied to the IoT edge module 100, which is electrically connected to the temperature differential power generation module 200. As a result, the IoT edge module 100 can be operated by the electric power supplied from the temperature differential power generation module 200.

The IoT edge module 100 and the temperature differential power generation module 200 configured as described above are installed, for example, on an agricultural land. As a result, it is possible to acquire information on the environmental condition of the agricultural land by the sensor incorporated in the IoT edge module 100.

A plurality of the IoT edge modules 100 and the temperature differential power generation modules 200 may be installed on the agricultural land. In the smart agricultural system, more agricultural land can be allocated according to the size of the agricultural land to obtain more detailed data on the environmental condition of the agricultural land.

Next, the output data from the sensor included in the IoT edge module 100 are transmitted to the data center 400 by the wireless communication module included in the IoT edge module 100. The output data from the sensor are transmitted to the data center 400 via the gateway 250 and the network 300.

The data center 400 is configured to collect the output data output from the sensor of the IoT edge module 100. The data center 400 is configured to grasp the environmental condition of the agricultural land in which the IoT edge module is installed based on the output data collected from the sensor of the IoT edge module 100, and calculate a growth condition of the crop optimal for the agricultural land based on the grasped environmental condition. Thereafter, the growth condition of the optimum crop calculated by the data center 400 is transmitted from the data center 400 to the tablet terminal 500 owned by the farmer through the network 300 and the gateway 250.

As a result, the farmer can grow the crop in the growth condition displayed on the tablet terminal 500, and thereby grow the crop in the growth condition optimal for the agricultural land.

In this way, the smart agricultural system allows for the efficient growth of the crops without relying on the experiences of farmers. According to the smart agricultural system, even inexperienced farmers can grow the crops efficiently, so the smart agricultural system is expected as a next-generation agricultural technique.

It is important to realize the power supply maintenance-free operation in the IoT edge module 100. That is, if the electric power generated by the temperature differential power generation module 200 can cover the electric power consumed by the IoT edge module 100, the IoT edge module can be operated semi-permanently without performing power supply maintenance (e.g., replacement of primary batteries, cleaning of photovoltaic panels, etc.) in the IoT edge module 100. In such cases, there is no need to perform power maintenance. This reduces cost of maintaining the smart agricultural system.

It should be noted that when a plurality of the IoT edge modules 100 are installed, the time required for the power supply maintenance is also prolonged. Therefore, by realizing maintenance-free power supply, the cost of maintaining the smart agricultural system can be further reduced.

Present embodiment has devised measures to realize maintenance-free power supply in the IoT edge module 100.

More specifically, the technical idea of present embodiment includes (1) a first point for increasing the power generation amount in the temperature differential power generation module 200, (2) a second point for realizing low power consumption of a microcomputer which is a component of the IoT edge module 100, and (3) a third point for supplying power to the sensor and the wireless communication module by the microcomputer. Hereinafter, a technical idea having these points will be described.

<Configuration of Differential Temperature Power Generation Module>

Figure 2:
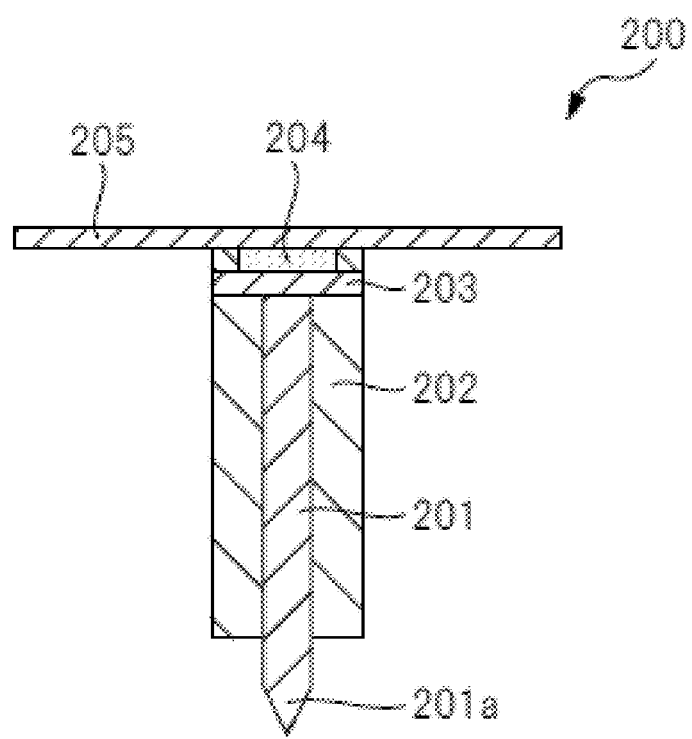
FIG. 2 is a cross-sectional view illustrating an exemplary configuration of a temperature differential power generation module according to the embodiment.

FIG. 2 is a cross-sectional view illustrating an exemplary configuration of the temperature differential power generation module in present embodiment.

In FIG. 2, the temperature differential power generation module 200 has a pile-shaped heat conductive material 201 and a coating material 202 with lower thermal conductivity than the heat conductive material 201. Here, a side surface of heat conductive material 201 is covered with the coating material 202. A distal end portion 201a of heat conductive material 201 is not covered with the coating material 202 and is exposed. Then, a heat conductive material 203 is provided so as to contact upper surface of the heat conductive material 201. A temperature difference power generating element 204 is provided on the heat conductive material 203. In addition, a heat conductive material 205 is provided so as to contact upper surface of the temperature difference power generating element 204. In this way, the temperature differential power generation module 200 is configured.

The pile-shaped heat conductive material 201 is embedded in the ground. And the distal end portion 201a of heat conductive material 201 is configured to have substantially the same temperature as the soil temperature. Then, in the temperature differential power generation module 200 in present embodiment, the side surface of heat conductive material 201 is covered with the coating material 202 which functions as a heat insulating material. Therefore, a temperature of near upper surface of the pile-shaped heat conductive material 201 is substantially the same temperature as a temperature of the distal end portion 201a of heat conductive material 201. This means that the heat conductive material 203 in contact with the pile-shaped heat conductive material 201 is approximately the same temperature as the soil temperature. This means that temperature of the bottom surface of the temperature difference power generating element 204 in contact with the heat conductive material 203 is approximately the same as the soil temperature.

On the other hand, a heat conductive material 205 is arranged so as to be contacted with the atmosphere on the ground surface. Consequently, the temperature of heat conductive material 205 is generally the same as the temperature of the atmosphere on the ground surface. Then, since upper surface of the temperature difference power generating element 204 is in contact with the heat conductive material 205, upper surface of the temperature difference power generating element 204 is generally the same temperature as the temperature of the atmosphere on the ground surface. Consequently, the bottom surface of the temperature difference power generating element 204 is substantially the same as the soil temperature, while the upper surface of temperature difference power generating element 204 is substantially the same temperature as the temperature of the atmosphere on the ground surface. That is, between both sides of the temperature difference power generating element 204, the temperature of the atmosphere of the ground surface and the soil temperature corresponding to the differences will occur. Thus, according to the temperature differential power generation module 200 in present embodiment, it is possible to cause a large temperature difference between both sides of the temperature difference power generating element 204. Then, the temperature difference power generating element 204, for example, because it is composised of the seebeck element, it is possible to increase a temperature difference becomes larger the power generation amount of the power, according to the configuration of the temperature differential power generation module 200 in present embodiment, it is possible to increase the power generation amount.

<First Idea>

First idea in present embodiment is that the temperature differential power generation module 200 is constructed as shown in FIG. 2. That is, as shown in FIG. 2, there is a first idea in that the distal end portion 201a of the pile-shaped heat conductive material 201 is embedded in the ground, and the side surface of the heat conductive material 201 is covered with the coating material 202 which functions as the heat insulating material. According to this first idea, the temperature of the bottom surface of the temperature difference power generating element 204 can be made substantially the same temperature as the soil temperature in which the distal end portion 201a is embedded. On the other hand, since upper surface of the temperature difference power generating element 204 is substantially the same temperature as the temperature of the atmosphere on the ground surface, a large temperature differential can be generated between both surfaces of the temperature difference power generating element 204. Consequently, according to first idea, it is possible to increase the power generation amount.

First Modified Example

Figure 3:
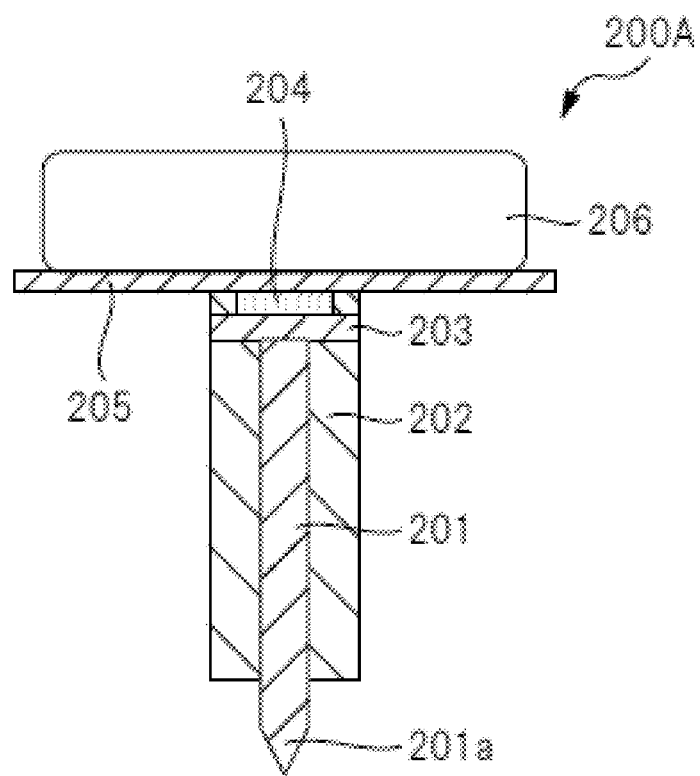
FIG. 3 is a cross-sectional view illustrating an exemplary configuration of a temperature differential power generation module in first modified example.

FIG. 3 is a cross-sectional view illustrating an exemplary configuration of the temperature differential power generation module according to the present first modified example.

The configuration of a temperature differential power generation module 200A shown in FIG. 3 is substantially the same as the configuration of the temperature differential power generation module 200 shown in FIG. 2. The difference between the temperature differential power generation module 200A shown in FIG. 3 and the temperature differential power generation module 200 shown in FIG. 2 is that the temperature differential power generation module 200A shown in FIG. 3 is provided with a bladder 206. That is, although the temperature differential power generation module 200 shown in FIG. 2 is assumed to be embedded in the ground, the present invention is not limited to this, and can be disposed on water by providing the bladder 206 as in the temperature differential power generation module 200A shown in FIG. 3.

According to the temperature differential power generation module 200A, since the temperature difference between a temperature in the water and a temperature of the water surface can be given to the temperature difference power generating element 204, the power can be generated by the temperature difference power generating element 204.

In place of the bladder 206, a fin structure may be provided. The temperature differential power generation module in this configuration is used as a embedded the temperature differential power generation module in the soil rather than the temperature differential power generation module placed on the water. For example, in the temperature differential power generation module 200 shown in FIG. 2, temperature of the heat conductive material 205, since it is affected by the temperature of the heat conductive material 203, there is a tendency that the temperature differences generated between both sides of the temperature difference power generating element 204 is reduced.

In this regard, mounting the fin structure on the heat conductive material 205 can increase the impact on the heat conductive material 205 from the fin structure having a large area of contact with the atmosphere to bring temperature of the heat conductive material 205 closer to the temperature of the atmosphere. Consequently, according to the temperature differential power generation module fitted with the fin structure, it is possible to increase the temperature differences generated between both surfaces of the temperature difference power generating element 204. In other words, it is enable to attach the fin structure to the heat conductive material 205 in order to bring temperature of the heat conductive material 205 close to the temperature of the atmosphere. This can increase the temperature difference between both sides of the temperature difference power generating element 204, thereby improving the power generation efficiency.

Second Modified Example

For example, the temperature difference power generating element 204 used in the temperature differential power generation module 200 shown in FIG. 2 is comprised of a seebeck element. This the seebeck element has a polarity. The temperature difference power generating element 204 comprises of the seebeck element. The temperature of upper surface of the temperature difference power generating element 204 is substantially the same temperature as temperature of the atmosphere. The temperature of bottom surface of the temperature difference power generating element 204 is substantially the same temperature as temperature of soil temperature. That is, for example, in FIG. 2, the temperature difference power generating element 204 is configured to be able to generate power when the temperature of upper surface is higher than the temperature of bottom surface. Conversely, if the temperature of upper surface is lower than the temperature of the bottom surface, power cannot be generated. Accurately, the power is generated even when the temperature of upper surface is lower than the temperature of the bottom, but the polarity of the generated power is the opposite polarity. Because of this, it is impossible to receive the generated current by a backflow prevention diode provided in the circuit. Therefore, the generated power is not available as enable.

Therefore, from the viewpoint of increasing the power generation amount, in the temperature differential power generation module 200, it is desirable that the generated power is configured to be enable available not only when the temperature of upper surface is higher than the temperature of the bottom surface, but also when the temperature of upper surface is lower than the temperature of the bottom surface.

Therefore, the configuration of the temperature differential power generation module that can be used enable for the generated power when the temperature of upper surface is not only high than the temperature of the bottom surface, but also when the temperature of upper surface is lower than the temperature of the bottom surface is explained.

Figure 4:
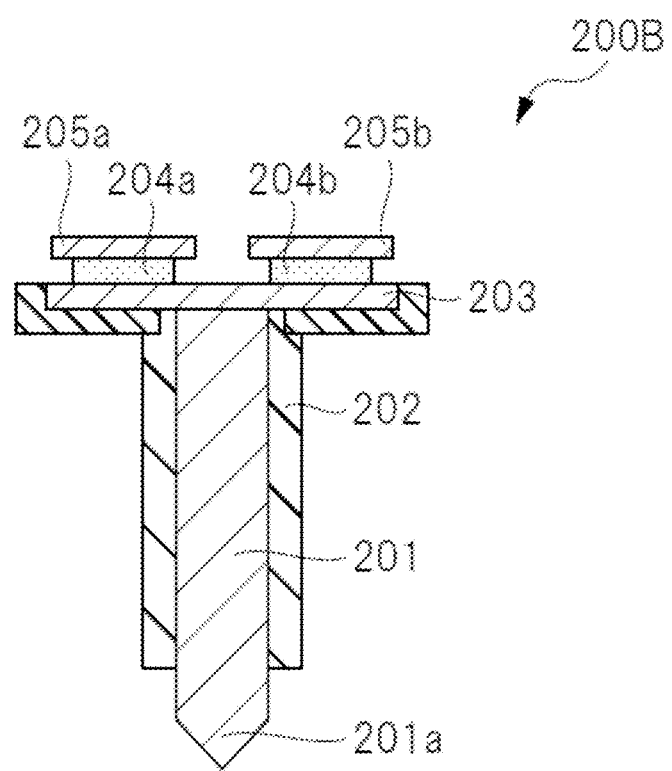
FIG. 4 is a cross-sectional view illustrating an exemplary configuration of a temperature differential power generation module in second modified example.

FIG. 4 is a cross-sectional view illustrating an exemplary configuration of the temperature differential power generation module according to the present second modified example.

In FIG. 4, a temperature differential power generation module 200B includes, for example, a temperature difference power generating element 204a comprised of the seebeck element and a temperature difference power generating element 204b comprised of the seebeck element. At this time, the temperature difference power generating element 204a and the temperature difference power generating element 204b are opposite in the polarity to each other. In other words, the temperature difference power generating element 204a is configured to generate power when the temperature of upper surface in contact with a heat conductive material 205a is higher than the temperature of the bottom surface in contact with the heat conductive material 203. On the other hand, the temperature difference power generating element 204b is configured to generate power when a heat conductive material 205b and upper surface in contact with the temperature is lower than the temperature of the bottom surface in contact with the heat conductive material 203.

Thus, according to the temperature differential power generation module 200B, when the temperature of the atmosphere on the ground surface is higher than the soil temperature, the temperature difference power generating element 204a contributes to power generation. In contrast, when the temperature of the atmosphere on the ground surface is lower than the soil temperature, the temperature difference power generating element 204b contributes to power generation. Consequently, according to the temperature differential power generation module 200B, since it is possible to generate power not only when the ground surface of the atmosphere on the temperature is higher than the soil temperature, but also when the temperature of the atmosphere on the ground surface is lower than the ground, it is possible to generate power efficiently.

Third Modified Example

Figure 5:
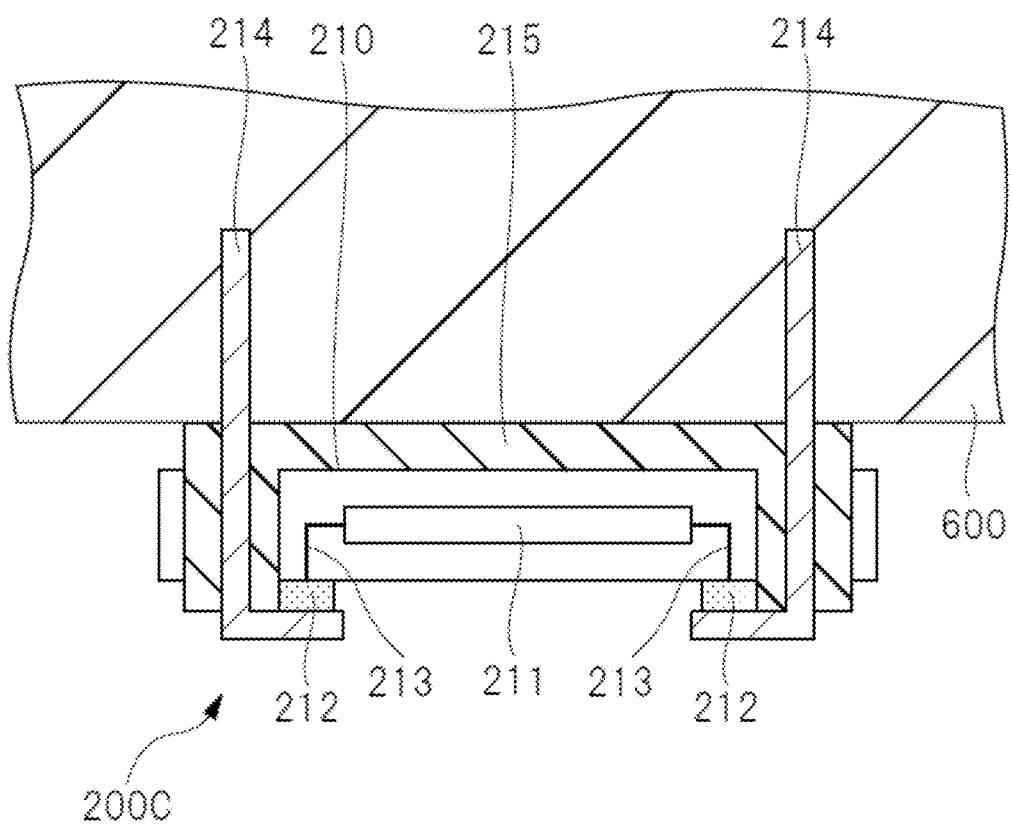
FIG. 5 is a cross-sectional view illustrating an exemplary configuration of a temperature differential power generation module in third modified example.

FIG. 5 is a cross-sectional view illustrating an exemplary configuration of the temperature differential power generation module according to the present third modified example.

In FIG. 5, a temperature differential power generation module 200C is configured to be attached to a wall 600. In particular, the temperature differential power generation module 200C includes a thermal conductive box 210. Within this thermal conductive box 210 is a sensor radio system 211. Further, on the outside of the thermal conductive box 210, a plurality of temperature difference power generating elements 212 is provided so as to contact the thermal conductive box 210. Each of the sensor radio system 211 and the plurality of temperature difference power generating elements 212 is connected by a power supply wire 213. Further, between the wall 600 and the thermal conductive box 210 is interposed a heat insulating material 215. Heat conductive materials 214 are connected to each of the plurality of temperature difference power generating elements 212. This heat conductive materials 214 are inserted into interior of the wall 600. Then, the portion of heat conductive materials 214 other than the portion inserted into the interior of the wall 600 is covered with the heat insulating material 215.

Figure 6:
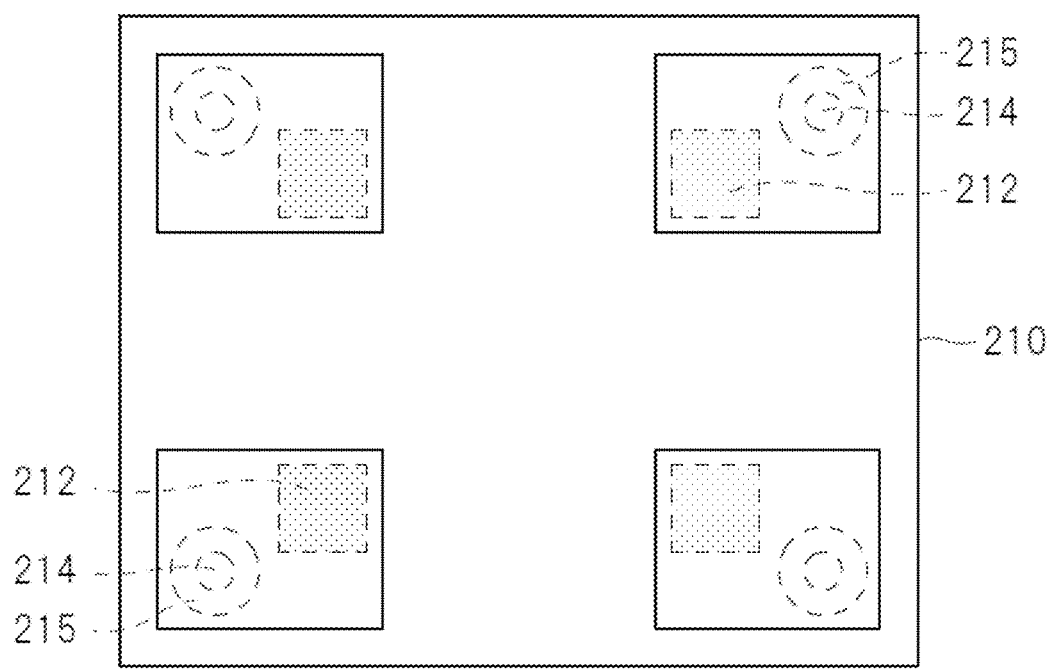
FIG. 6 is a plan view illustrating an exemplary arrangement of a thermal conductive box with a plurality of temperature difference power generating elements and a heat conductive material and a heat insulating material.

FIG. 6 is a plan view illustrating an exemplary arrangement of the thermal conductive box 210, a plurality of temperature difference power generating elements 212, the heat conductive materials 214, and the heat insulating materials 215. As shown in FIG. 6, the thermal conductive box 210 are provided four temperature difference power generating elements 212. Then, it can be seen that the heat insulating material 215 is provided so as to cover the periphery of heat conductive material 214.

According to the temperature differential power generation module 200C configured in this manner, as a result of temperature inside the wall 600 and temperature of the heat conductive material 214 being substantially the same temperature, a temperature difference corresponding to the difference between the temperature inside the wall 600 and the temperature of the thermal conductive box 210 is applied to each of the plurality of temperature difference power generating elements 212. Consequently, in the plurality of temperature difference power generating elements 212, power is generated due to the temperature differences described above.

The temperature differential power generation module 200C in the present third modified example can be used, for example, not only in the smart agricultural system using the wireless sensor network, but also in systems for monitoring aging of bridges and tunnels using the wireless sensor network. Specifically, it can be used as a power source to the sensor that monitors deterioration of the inner walls of bridges or tunnels. That is, the temperature differential power generation module 200C has a wide range of applications to sensor systems in that it can generate electricity even in places where light is not inserted and it is difficult to generate electricity by solar power generation. For example, when solar power generation is used, sunlight needs to be inserted into a place where a solar power generation device is installed. However, depending on the installation location, there are places where light does not reach, and therefore, solar power generation cannot be used. By installing the temperature differential power generation module 200C in this third modified example, the power can be generated even in a location where no light is inserted, and the sensor can be operated.

<Configuration of the Temperature Difference Power Generation Element>

Figure 7:
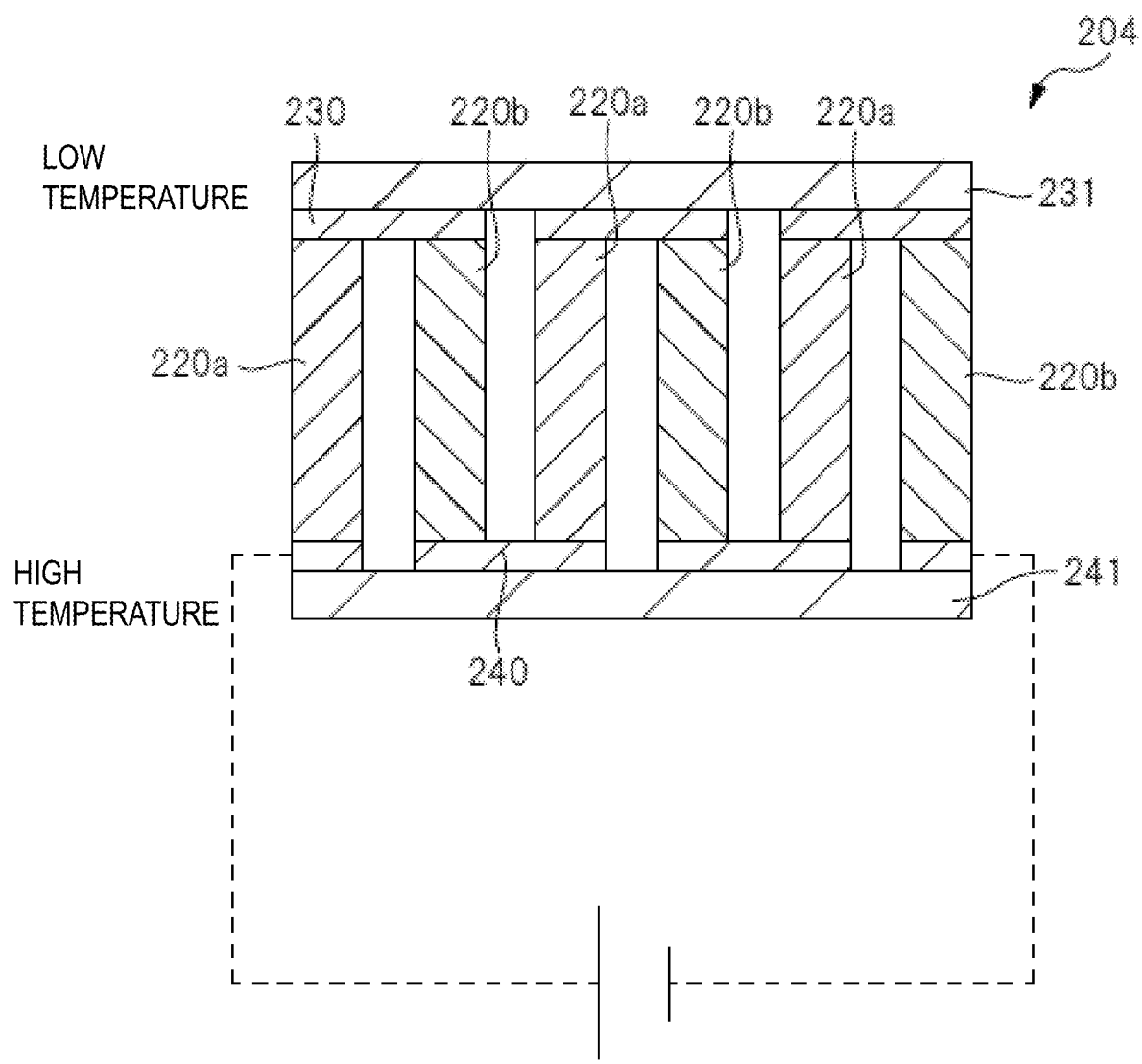
FIG. 7 is a schematic diagram illustrating an exemplary configuration of a seebeck element constituting a temperature difference power generating element.

FIG. 7 is a schematic diagram illustrating an exemplary configuration of the seebeck element constituting the temperature difference power generating element.

In FIG. 7, the seebeck element constituting the temperature difference power generating element 204 has a configuration in which a n-type semiconductor 220a and a p-type semiconductor 220b are alternately connected by an electrode 230 and an electrode 240. The electromotive force is generated in the seebeck element when an electrode 231 connected to the electrode 230 is cooled down, low temperature, while an electrode 241 connected to the electrode 240 is heated to a high temperature. That is, the seebeck element generates the electromotive force when a temperature differential is applied between the electrode 231 and the electrode 241. Thus, the temperature difference power generating element comprising of the seebeck element can be generated the power depending on the temperature differences.

<Configuration the IoT Edge Module>

Next, the configuration of the IoT edge module will be described.

Figure 8:
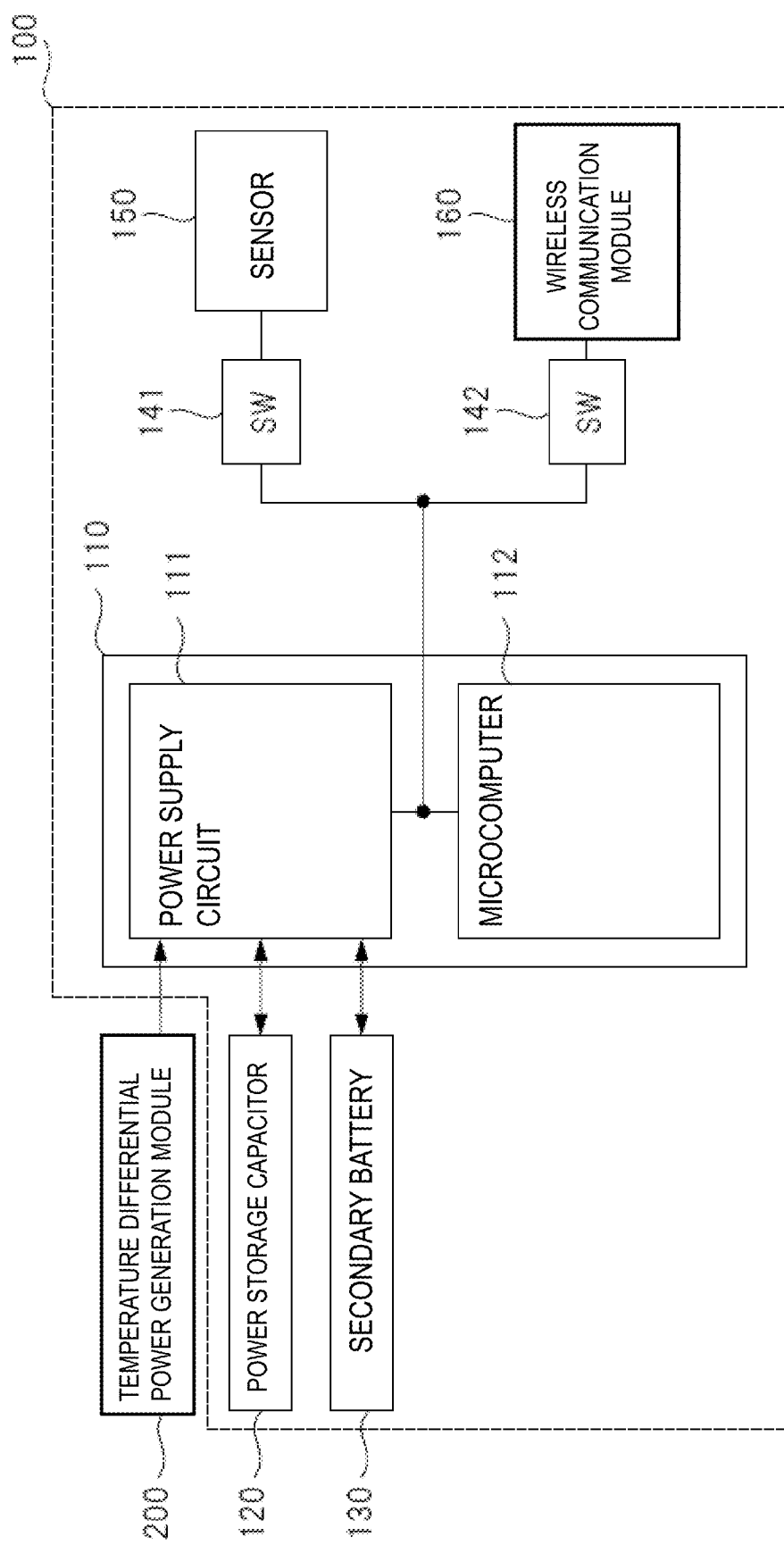
FIG. 8 is a block diagram showing a configuration of an IoT edge module.

FIG. 8 is a block diagram showing the configuration of the IoT edge module.

In FIG. 8, the IoT edge module 100 has a controller 110, a power storage capacitor 120, a secondary battery 130, a switch 141, a switch 142, a sensor 150, and a wireless communication module 160.

The controller 110 includes a power supply circuit 111 and a microcomputer 112. The controller 110, for example, is constituted by one chip, and the power supply circuit 111 and the microcomputer 112 are integrated in one chip constituting the controller 110. The power supply circuit 111 is electrically connected to the temperature differential power generation module 200 and is configured to control supplying power from the temperature differential power generation module 200. The power supply circuit 111 is also electrically connected to the power storage capacitor 120 and the secondary battery 130. The power supply circuit 111 is configured to control the charging and discharging to and from the power storage capacitor 120, and to control the charging and discharging to the secondary battery. Further, the power supply circuit 111 is also configured to control the power supply to the microcomputer based on the charging status of the power storage capacitor 120 and the secondary battery 130.

Subsequently, the microcomputer 112 is configured to control ON or OFF of the switch 142 connected to the wireless communication module 160 and the switch 141 connected to the sensor 150. Specifically, the microcomputer 112 is configured to control the supply or shut-off of power to the sensor 150 by controlling ON or OFF of the switch 141. And the microcomputer 112 is configured to control the supply or shut off of power to the wireless communication module 160 by controlling ON or OFF of the switch 142.

The microcomputer 112 inputs data from the sensor 150 and stores the data in the microcomputer 112. It is also configured to control the sending of the information from the wireless communication module 160 to the data center 400.

Here, the controller 110 is not limited to a one-chip configuration, and may have a SIP (System In Package) configuration in which the power supply circuit 111 and the microcomputer 112 formed on different chips are enclosed in one package. Further, the power supply circuit 111 and the microcomputer 112 may be configured by individual package structures.

The IoT edge module 100 is configured as described above.

<Operation of Power Supply Circuit>

Figure 9A:
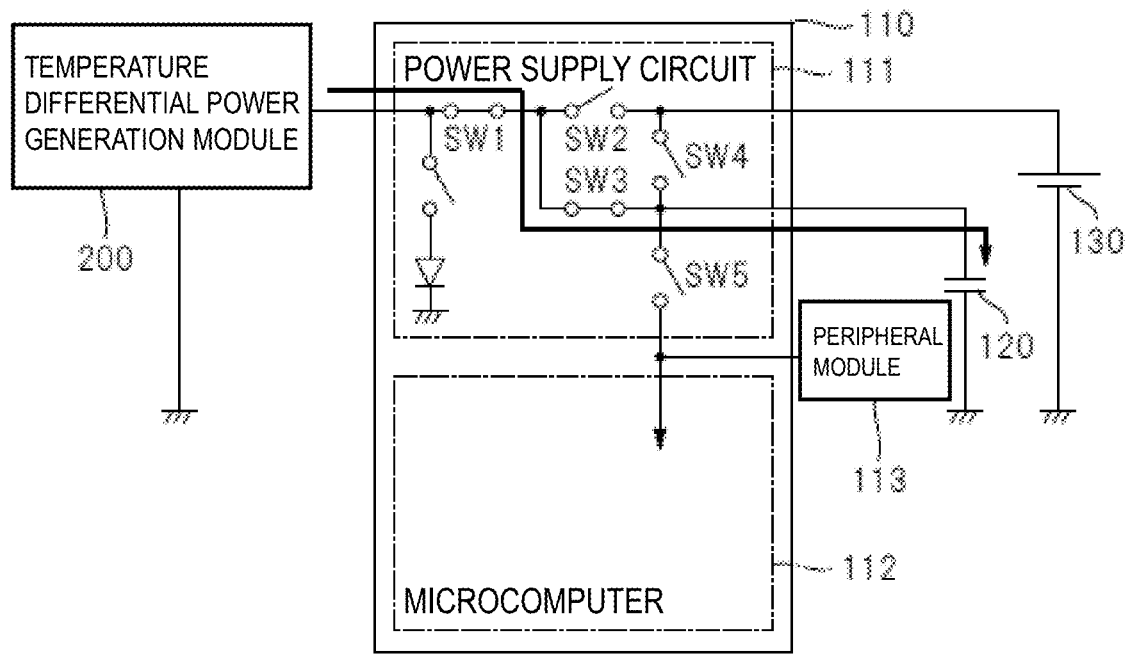
FIG. 9A is a diagram illustrating an operation of a power supply circuit in an initial charge period.

Next, the operation of the power supply circuit 111, which is a component of the IoT edge module 100, will be described. FIG. 9A is a diagram illustrating the operation of the power supply circuit in the initial charge period. In the illustrated FIG. 9A, the power supply circuit 111 controls ON or OFF of switches SW1 to SW5 provided therein so as to store the electric power generated by the temperature differential power generation module 200 in the power storage capacitor 120. For example, as shown in FIG. 9A, the power supply circuit 111 turns on the switch SW1 and the switch SW3, and turns off the switch SW2, the switch SW4, and the switch SW5. As a result, the current from the temperature differential power generation module 200 flows into the power storage capacitor 120 via the switch SW1 and the switch SW3 which are turned on. This begins charging the power storage capacitor 120. Then, when the power storage capacitor 120 is sufficiently charged, the power supply circuit 111 executes the activation control of the microcomputer 112.

Figure 9B:
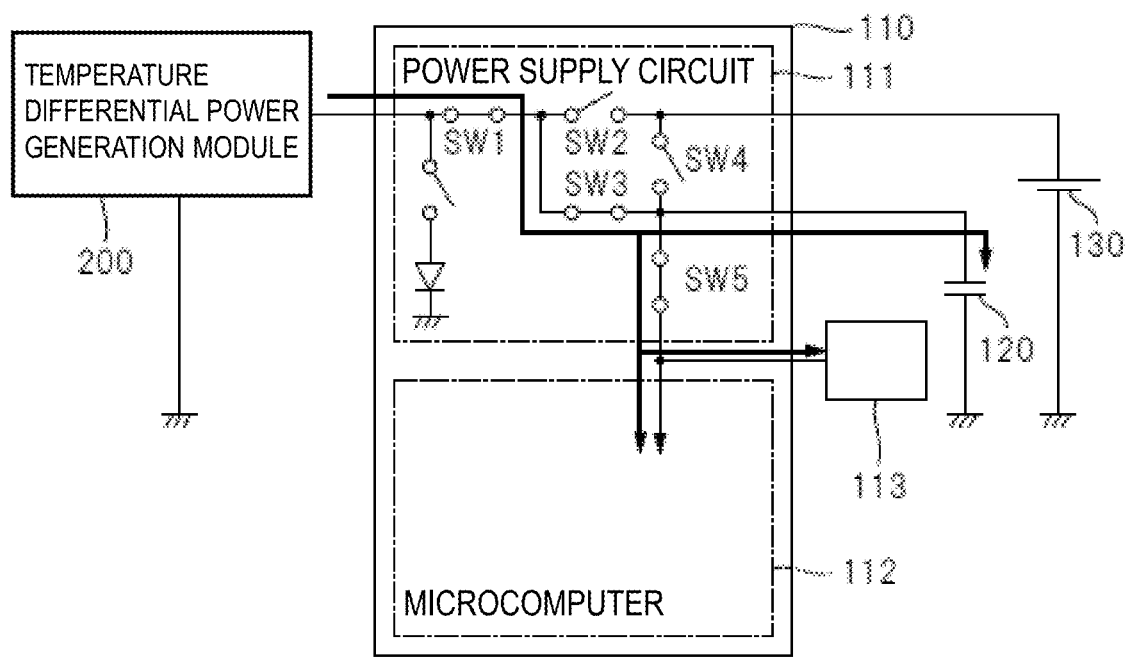
FIG. 9B is a diagram for explaining a start operation of a microcomputer by a power supply circuit.

FIG. 9B is a diagram for explaining the start operation of the microcomputer by the power supply circuit. In FIG. 9B, for example, when the voltage of the power storage capacitor 120 exceeds 2.6V, the power supply circuit 111 turns on the switch SW5. As a result, the switch SW1, the switch SW3, and the switch SW5 are turned on, while the switch SW2 and the switch SW4 are turned off. Therefore, together with the current from the temperature differential power generation module 200 flows into the power storage capacitor 120, power is supplied to the microcomputer 112 and a peripheral module 113 via the switch SW5 from the power storage capacitor 120. As a result, the microcomputer 112 is started. The microcomputer 112 starts executing the programs and allows the secondary battery 130 to be charged. At this time, the power required to activate the microcomputer 112 is very low.

When charging to the secondary battery 130 is permitted by the microcomputer 112, the power supply circuit 111 performs control to store electric power generated by the temperature differential power generation module 200 in the secondary battery 130.

Incidentally, the peripheral module 113 includes the sensor 150, the wireless communication module 160, the switch 141 and the switch 142 and the like.

Figure 10A:
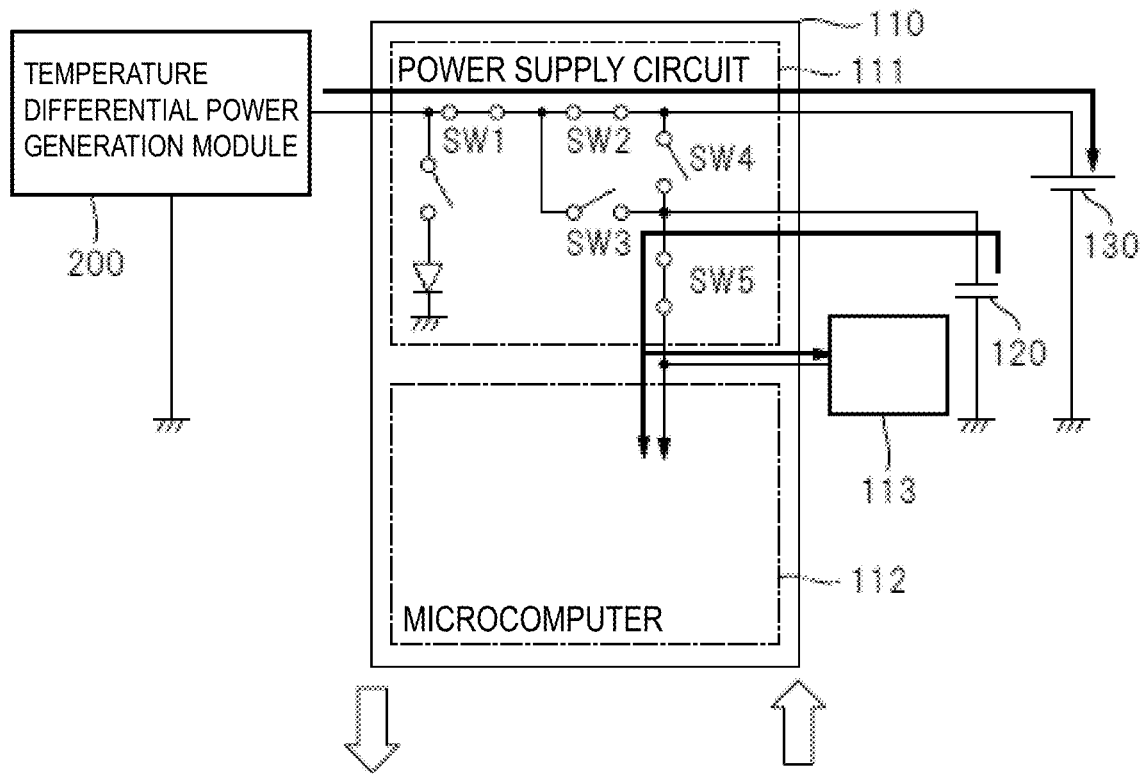
FIG. 10A is a diagram for explaining an operation of a power supply circuit in a secondary battery charging period.

FIG. 10A is a diagram for explaining the operation of the power supply circuit in the secondary battery charging period. In FIG. 10A, the power supply circuit 111 controls ON or OFF of the switches SW1 to SW5 provided therein so as to store the electric power generated by the temperature differential power generation module 200 in the secondary battery 130. For example, as shown in FIG. 10A, the power supply circuit 111 turns on the switch SW1, the switch SW2, and the switch SW5, and turns off the switch SW3 and the switch SW4. As a result, the current from the temperature differential power generation module 200 flows into the secondary battery 130 via the turned-on switch SW1 and the switch SW2. Thus, charging to the secondary battery 130 is started. Also, the current from the power storage capacitor 120 flows into the microcomputer 112 and the peripheral module 113 via the switch SW5. For this reason, the microcomputer 112 and the peripheral module 113 continue to operate using the stored power of the power storage capacitor 120. Thereafter, continuing the operation of the microcomputer 112 and the peripheral module 113, when the power stored in the power storage capacitor 120 is reduced, the power supply circuit 111 stops charging the secondary battery 130, starts charging the power storage capacitor 120.

Figure 10B:
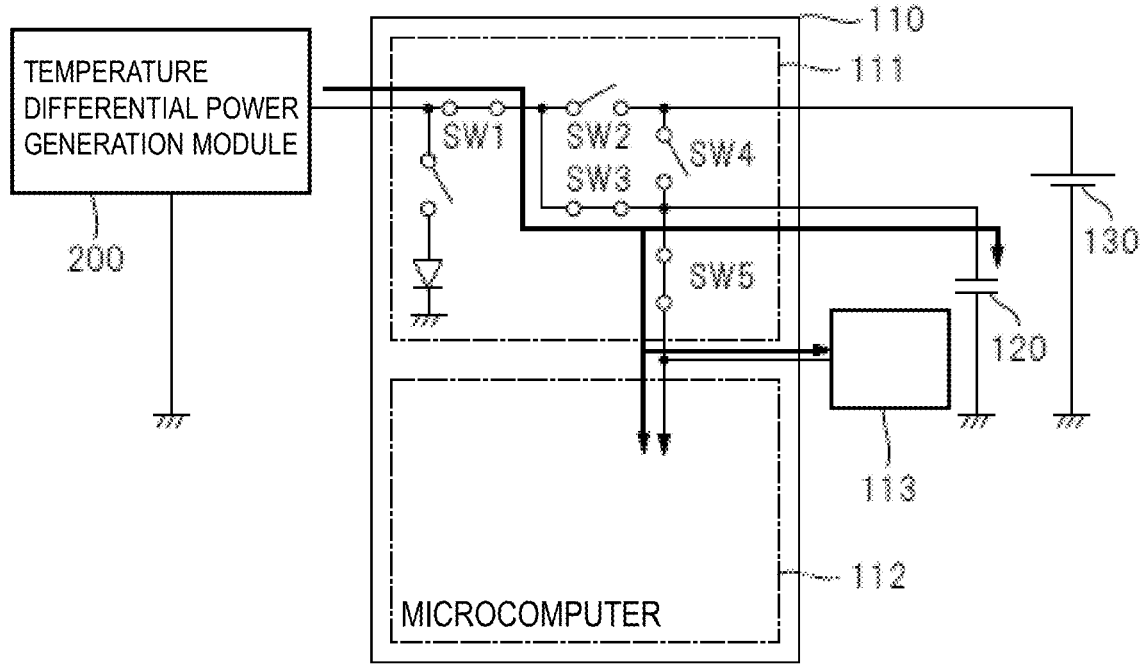
FIG. 10B is a diagram illustrating a charging operation to a power storage capacitor.

FIG. 10B is a diagram illustrating a charging operation to the power storage capacitor. In FIG. 10B, when the electric power stored in the power storage capacitor 120 decreases, the power supply circuit 111 controls ON or OFF of the switches SW1 to SW5 provided therein, thereby interrupting the charging of the secondary battery 130 and starting the charging of the power storage capacitor 120. For example, as shown in FIG. 10B, the power supply circuit 111 turns on the switch SW1, the switch SW3, and the switch SW5, and turns off the switch SW2 and the switch SW4. As a result, the current from the temperature differential power generation module 200 flows into the power storage capacitor 120 via the switch SW1 and the switch SW3 which are turned on, and the power storage capacitor 120 starts to be charged. The current from the temperature differential power generation module 200 also flows into the microcomputer 112 and the peripheral module 113 via the switch SW1, the switch SW3, and the switch SW5. For this reason, the microcomputer 112 and the peripheral module 113 continue to operate using the power supplied from the temperature differential power generation module 200.

Then, when the power storage capacitor 120 is sufficiently charged, again, the process proceeds to the operation shown in FIG. 10A, charging the secondary battery 130 is performed. In this way, the charging operation to the secondary battery 130 and the charging operation to the power storage capacitor 120 is repeated alternately.

Figure 11:
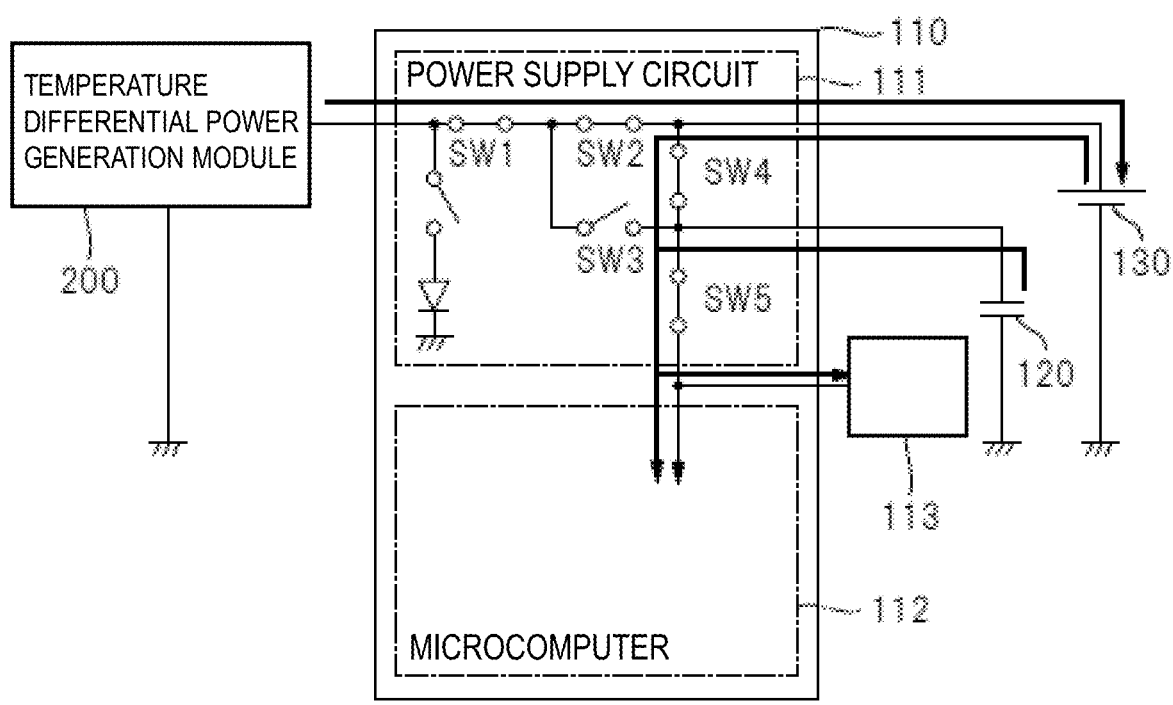
FIG. 11 is a diagram for explaining a power supply by a secondary battery.

Thereafter, as shown in FIG. 11, when the secondary battery 130 is sufficiently charged, the power supply circuit 111 turns on the switch SW4 and the switch SW5, and electric power is supplied from the secondary battery 130 and the power storage capacitor 120 to the microcomputer 112 and the peripheral module 113.

<Second Idea>

Present embodiment is devised to reduce the power consumed by the microcomputer 112, which is a component of the IoT edge module 100. This device is second idea in present embodiment. Specifically, second idea in present embodiment is that the microcomputer 112 includes a field effect transistor formed on a SOTB substrate. Thus, according to the microcomputer 112 in present embodiment, it is possible to realize a low power dissipation of the microcomputer 112.

Figure 12:
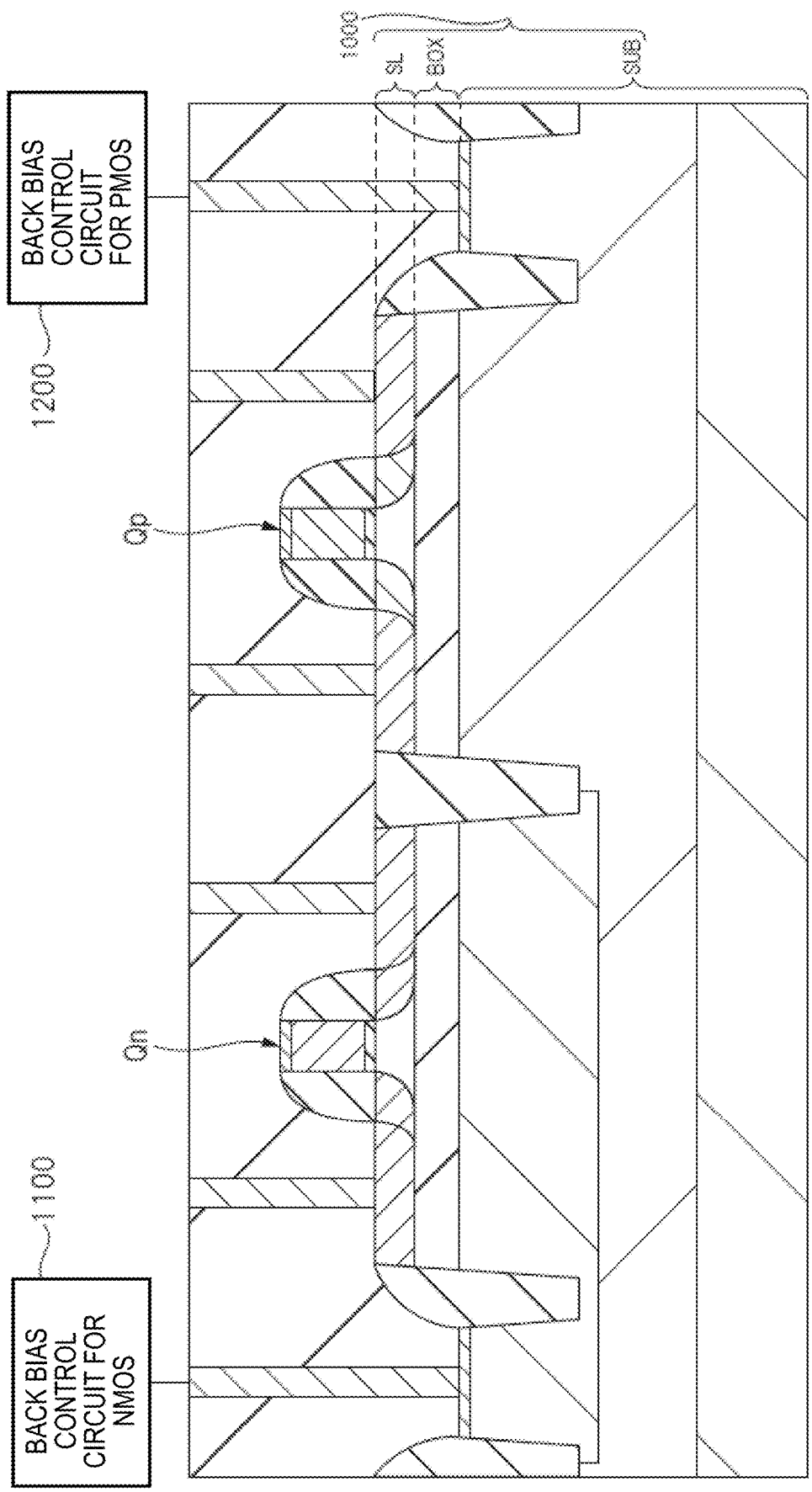
FIG. 12 is a diagram illustrating a field effect transistor formed in a SOTB substrate.

FIG. 12 is a diagram illustrating a field effect transistor formed in the SOTB substrate.

In FIG. 12, the SOTB substrate 1000 consists of a substrate SUB, a buried insulating layer BOX, and a silicon layer SL. At this time, the thickness of the buried insulating layer BOX is reduced to about 15 nm. On the SOTB substrate 1000 configured in this way, a n-channel type field effect transistor Qn and a p-channel type field effect transistor Qp are formed. Then, for example, a back bias is applied to the n-channel type field effect transistors Qn through a thin buried insulating layer BOX from the substrate SUB side electrically connected to a back bias control circuit for NMOS 1100. Similarly, a back bias is applied to the p-channel type field effect transistors Qp through the thin buried insulating layer BOX from the substrate SUB side, which is electrically connected to a back bias control circuit for PMOS 1200.

According to the microcomputer 112 including the field effect transistors formed in the SOTB substrate 1000 will be described why the power saving of the microcomputer 112 can be realized.

The field effect transistors have a gate electrode and a source region and a drain region and forms an inversion layer, inversion channel, in a channel region between the source region and the drain region by applying a gate voltage equal to or higher than the threshold voltage to the gate electrode. Then, by providing a potential difference between the source region and the drain region, a current can be passed between the source region and the drain region through the channels. On the other hand, when a voltage lower than the threshold voltage is applied to the gate electrode, the inversion layer formed on the channel region disappears. This cuts off the current flowing between the source region and the drain region. Thus, in the field effect transistors, by controlling the gate voltage applied to the gate electrode, it is possible to control the conduction or non-conductive between the source region and the drain region. That is, the field effect transistors can be referred to as a switching device having the gate electrode as a control electrode.

Here, the field effect transistors generally involves adjusting the threshold voltage by introducing conductivity-type impurities into the channel region. However, it is difficult to accurately control the impurity concentration of the conductivity type impurity introduced into the channel region, and concentration variation occurs. Then, that the concentration variation occurs means that the threshold voltage varies. Therefore, the gate voltage to be applied to the gate electrode must be set to a higher value considering the threshold voltage variation. Therefore, the power consumed to operate the field effect transistors increase. In this regard, present embodiment employs a so-called dopant-less channel structure that does not introduce conductivity-type impurities into the channel region sandwiched between the source region and the drain region, assuming that the field effect transistors are formed on the SOI (Silicon On Insulator) substrate. In this case, since no conductivity type impurities are introduced into the channel region, the result of reducing the concentration variation (e.g., about ⅓), since there is no need to set with a margin higher the gate voltage to be applied to the gate electrode, it is possible to reduce the power consumption for operating the field effect transistors. That is, the power dissipation of the microcomputer 112 including the field effect transistors can be reduced.

A side effect associated with dopant-less structure field effect transistors, however, is the increased off-leakage current when the field effect transistors are switched off. In this case, even if the dopant-less channel structure is adopted, since the off-leakage current is increased, it is difficult to sufficiently reduce the power consumption.

Therefore, in present embodiment, assuming that the field effect transistors are formed on SOI substrate, the buried insulating layer of SOI substrate is made thinner and the back bias is applied to the channel region through the thin buried insulating layer from substrate underneath the field effect transistors. In this case, for example, since the thickness of the buried insulating layer is as thin as about 15 nm, by applying a back bias from substrate side, it is possible to reduce the off-leakage current flowing through the channel region.

Thus, in present embodiment, the power dissipation of the microcomputer 112 is reduced by adopting a dopant-less channel structure for the field effect transistors, which is a component of the microcomputer 112, and by forming the field effect transistors on SOI substrate of the SOTB substrate, which has a thinned buried insulating layer. This point is second idea in present embodiment, it is possible to realize a low power dissipation of the microcomputer 112 by this second idea.

For example, according to the microcomputer 112 comprised of the field effect transistors formed on the SOTB substrate, 35 μA/MHz at 32 MHz can be realized at the on-time, and the off-leakage current at the off-time can be suppressed to 500 nA or less.

<Third Idea>

Next, a third idea of present embodiment will be described. The third idea in present embodiment is the device for the operation of supplying power to the sensor and the wireless communication module by the microcomputer. In particular, the third idea is to reduce the power consumption of the IoT edge module by controlling the microcomputer so as to minimize the power consumption spent in supplying power to the sensor and the wireless communication module.

<Basic Concept>

The basic philosophy of the third idea is the philosophy of constructing the microcomputer to determine a power supply operation to the wireless communication module and the sensor based on the temperature differential power generation module's a power generation status. For example, this basic philosophy implements the power supply operation to the wireless communication module at a first time interval set based on the power generation amount on the day when the power generation amount is lowest in the temperature differential power generation module. And it can also be achieved by configuring the microcomputer to perform the power supply operation to the sensor with the second time interval set based on the power generation amount on the day when the power generation amount is least in the temperature differential power generation module. According to this basic philosophy, power consumed by the IoT edge module can be supplied even on days when the power generation amount at the temperature differential power generation module is lowest. This means that the IoT edge module can be operated semi-permanently without performing power maintenance in the IoT edge module. Since the power supply need not be maintained, the costs of maintaining the smart agricultural system using the IoT edge module, for example, can be reduced.

As a development of the basic idea, when the IoT edge module includes a power storage device such as a secondary battery, it is conceivable to configure the microcomputer as follows. The microcomputer is configured to determine the power supply operation to the wireless communication module and the sensor considering not only the power generation status of the temperature differential power generation module but also power storage state of the power storage device. That is to say, the basic idea can be developed to the philosophy of comprising the microcomputer such that the power supply operation to the wireless communication module and the sensor is determine, based on the combination of the temperature differential power generation module's the power generation status and the power storage device's power storage state.

Hereinafter, an example in which the basic idea is embodied will be described.

<Functional Configuration of the Microcomputer>

Figure 13:
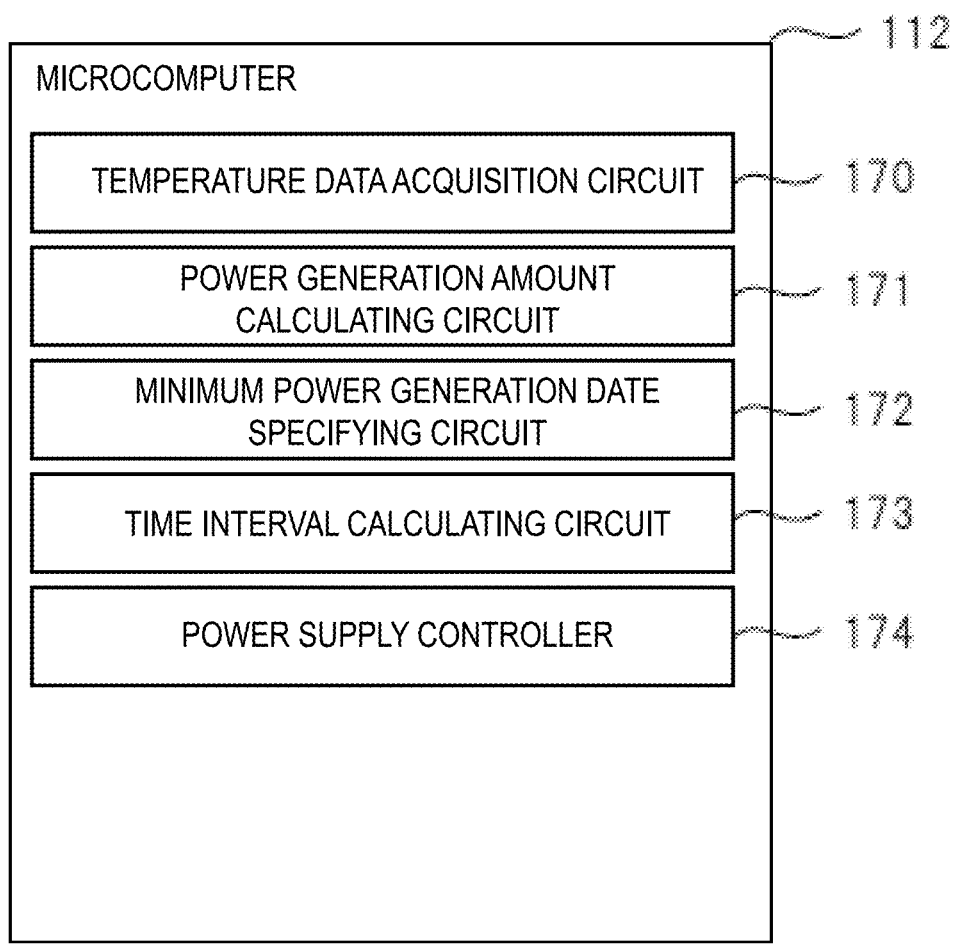
FIG. 13 is a functional diagram showing a functional configuration of a microcomputer.

FIG. 13 is a functional diagram showing the functional configuration of the microcomputer.

The microcomputer 112 has a temperature data acquisition circuit 170, a power generation amount calculating circuit 171, a minimum power generation date specifying circuit 172, a time interval calculating circuit 173, and a power supply controller 174.

The temperature data acquisition circuit 170 is configured to acquire hourly temperature data for each year in the atmosphere on the ground surface and the ground, in the soil. The temperature data acquisition circuit 170 is configured to acquire temperature data from the data center 400 shown in FIG. 1 via the network 300, for example. The temperature data acquired by the temperature data acquisition circuit 170 is previously provided from the data center 400. However, if the sensor 150 contains the temperature sensor, the temperature data acquisition circuit 170 acquires the temperature data may be the temperature sensor included in the sensor 150. In addition, the temperature data of the farmland to be installed may be obtained in advance by another measuring device operating on batteries or the like.

The temperature data is preferably temperature data of the agricultural land in which the IoT edge module is installed. However, the temperature data is not limited to this, but can also use, for example, local temperature data with similar climatic regimes.

The advantages of the configuration for obtaining the temperature data from the data center 400 will now be described.

For example, during the first year of the IoT edge module's installation on agricultural land, even if the sensor 150 included in the IoT edge module contains the temperature sensor, this temperature sensor cannot be used to obtain hourly temperature data throughout the year. In other words, if the IoT edge module is not operated for at least one year, the IoT edge module itself cannot acquire the temperature data per unit of time for temperature year.

On the other hand, if the temperature data is acquired from the data center 400, it is possible to acquire the temperature data per unit hour throughout the year even if the IoT edge module itself is not operated for one year or more. This means that the analysis process based on the temperature data per unit hour can be realized from the beginning of the installation of the IoT edge module on the agricultural land through the year. That is, the advantages of the configuration for acquiring the temperature data from the data center 400 include that the analysis process based on the temperature data per unit time can be realized from the beginning of the installation of the IoT edge module on the agricultural land through the year.

On the other hand, it is considered that the temperature data transmitted from the data center 400 is not a local temperature data reflecting the weather condition of the agricultural land in which the IoT edge module is installed, but a wide-area temperature data including the agricultural land in many cases. The temperature data obtained from the data center 400 may not accurately reflect the environmental condition of the agricultural land in which the IoT edge module is installed. In this regard, the temperature data acquired by the temperature sensor included in the IoT edge module itself accurately reflects the environmental requirements of the agricultural land. Therefore, as an advantage of the configuration for acquiring the temperature data acquired by the temperature sensor included in the IoT edge module, it is possible to realize an analysis process based on the temperature data which accurately reflects the environmental condition of the agricultural land in which the IoT edge module is installed.

From the above, for example, it is desirable to adopt a configuration in which the temperature data transmitted from the data center 400 is used for the first year after the IoT edge module is installed on the agricultural land, and to adopt a configuration in which the temperature data acquired by the temperature sensor installed on the IoT edge module itself is used after the IoT edge module itself is operated for one year or more.

The power generation amount calculating circuit 171 is configured to calculate the daily power generation amount of the temperature differential power generation module 200 throughout the year based on the temperature data acquired in the temperature data acquisition circuit 170.

The minimum power generation date specifying circuit 172 is configured to identify the days with the least power generation amount based on the power generation amount calculated in the power generation amount calculating circuit 171.

The time interval calculating circuit 173 is configured to calculate the first time interval for stable operation of the wireless communication module 160 and the second time interval for stable operation of the sensor 150 based on the power generation amount of the date specified in the minimum power generation date specifying circuit 172.

Where the first time interval can be longer than the second time interval. This generally considers that the power for operating the wireless communication module 160 is greater than the power for operating the sensor 150. That is, the power dissipation of the IoT edge module 100 can be reduced by making the operation interval, which is first time interval, of the wireless communication module 160 with large power longer than the operation interval, which is second time interval, of the sensor 150 with small power. The data output from the sensor 150 is stored in a memory of the microcomputer 112 in a predetermined amount, and then collectively transmitted from the wireless communication module 160.

However, the first time interval is not limited to being longer than the second time interval, and, for example, the first time interval and the second time interval may be substantially the same. Output data from the sensor 150 is transmitted from the wireless communication module 160 in real time.

The time interval calculating circuit 173 calculates the first time interval for stable operation of the wireless communication module 160 and the second time interval for stable operation of the sensor 150 based on a pre-programmed algorithms. In addition, the time interval calculating unit 173 may be configured to use artificial intelligence to calculate the first time interval for stable operation of the wireless communication module 160 and the second time interval for stable operation of the sensor 150.

The power supply controller 174 is configured to perform the power supply operation to the wireless communication module 160 with the first time interval calculated by the time interval calculating circuit 173, and perform the power supply operation to the sensor 150 with the second time interval calculated by the time interval calculating circuit 173.

<Example of the microcomputer operation>

The microcomputer 112 in present embodiment is configured as described above, and an exemplary operation of the microcomputer 112 will be described below.

Figure 14:
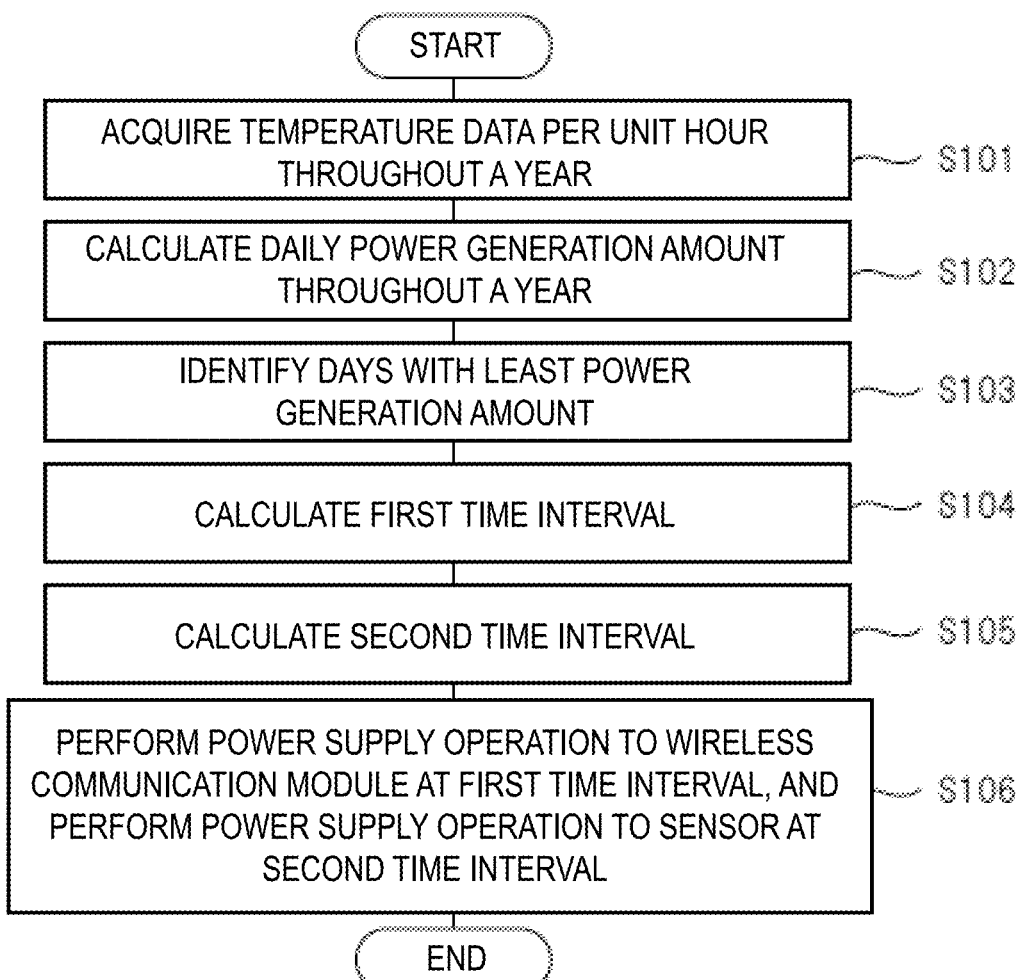
FIG. 14 is a flow chart illustrating an exemplary operation of a microcomputer.

FIG. 14 is a flow chart illustrating an exemplary operation of the microcomputer.

Referring to FIG. 14, first, the temperature data acquisition circuit 170 of the microcomputer 112 acquires the temperature data from the data center 400 through the network 300 per unit time (e.g., one hour) per year by using the wireless communication module 160 (in step S101). The temperature data should be the annual temperature data of the location where the IoT edge module was installed, but the projected temperature may be used to use the annual trend of the location where the IoT edge module is to be installed. The temperature data need not be measured.

The temperature data acquired in the temperature data acquisition circuit 170 includes the temperature data for temperature of the atmosphere on the ground surface and the temperature data for the soil temperature.

The temperature data is preferably temperature data of the site where the IoT edge module is installed. However, the present invention is not limited to this, and may be substituted by the temperature data of the same environmental as the land to be installed. Further, the unit time of the temperature data is not limited to every hour, and the unit time may be daily or monthly as long as there is a difference in temperature.

The power generation amount calculating circuit 171 of the microcomputer 112 then calculate the daily power generation amount throughout the year based on the temperature data acquired in the temperature data acquisition circuit 170 (in step S102).

Thereafter, the minimum power generation date specifying circuit 172 of the microcomputer 112 identifies the date with the least power generation amount based on the power generation amount calculated in the power generation amount calculating circuit 171 (in step S103).

Subsequently, the time interval calculating circuit 173 of the microcomputer 112 calculates the first time interval for stable operation of the wireless communication module 160 based on the power generation amount of the day identified in the minimum power generation date specifying circuit 172 in step S104. In addition, the time interval calculating circuit 173 calculates the second time interval for stable operation of the sensor 150 in step S105.

Here, the power consumed to operate the wireless communication module 160 and the power consumed to operate the sensor 150 must not exceed the power generation amount of the day with the least power generation amount. When the time interval is calculate, the transmission interval, which is first time interval, and the operation interval, which is second time interval, are calculated considering the power consumed once and the number of operations.

The power supply controller 174 of the microcomputer 112 performs the power supply operation to the wireless communication module 160 with the first time interval calculated by the time interval calculating circuit 173, and performs the power supply operation to the sensor 150 with the second time interval calculated by the time interval calculating circuit 173 in step S106. In this manner, according to the IoT edge module 100 in present embodiment, the power consumed by the IoT edge module 100 can be supplied even on the day when the power generation amount in the temperature differential power generation module 200 is the smallest day. This means that the IoT edge module 100 can be operated semi-permanently without performing power maintenance in the IoT edge module 100. Since the power supply need not be maintained, the costs of maintaining the smart agricultural system using the IoT edge module 100, for example, can be reduced.

<Example of other the microcomputer operation>

Next, another exemplary operation of the microcomputer 112 will be described.

Figure 15:
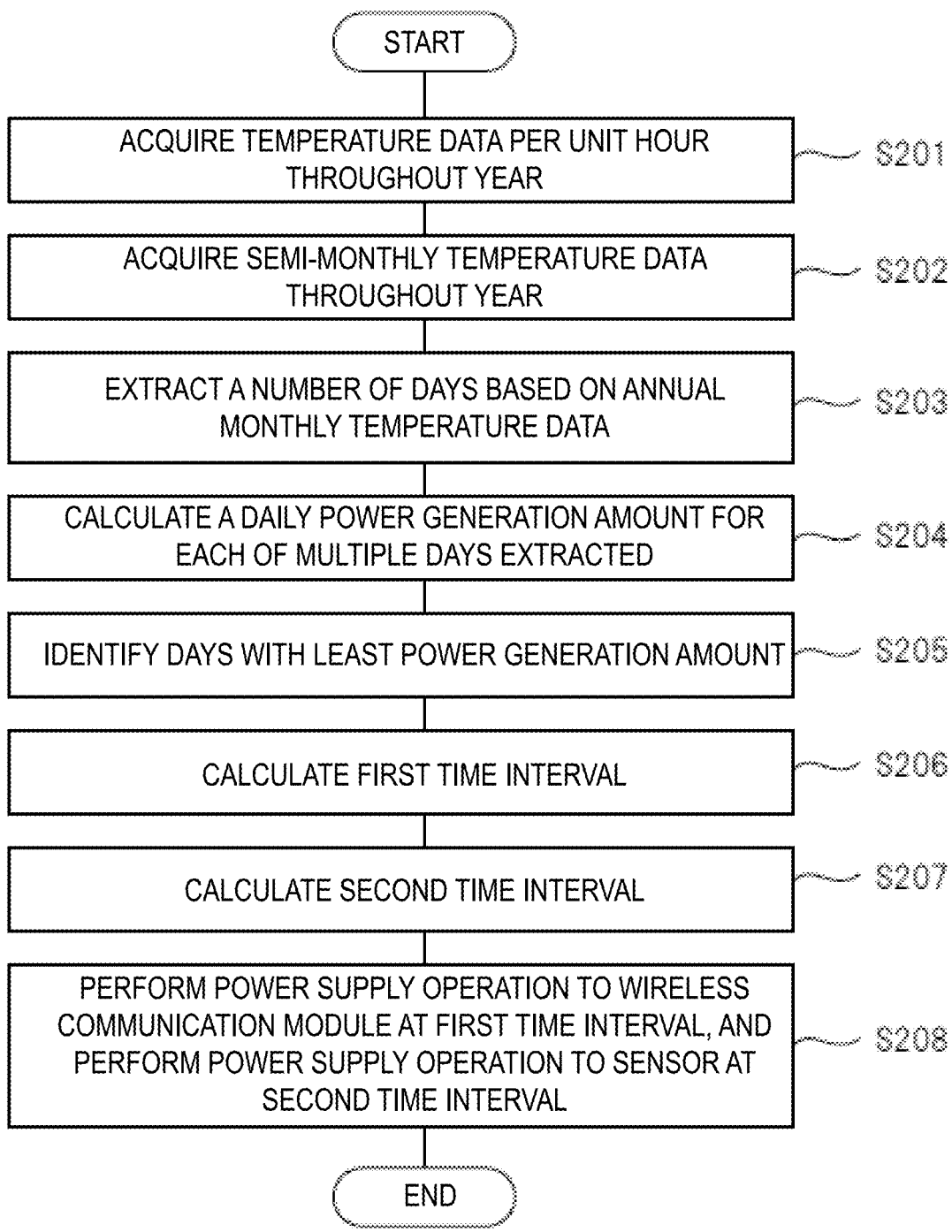
FIG. 15 is a flow chart for explaining another exemplary operation of a microcomputer.

FIG. 15 is a flow chart for explaining another exemplary operation of the microcomputer.

Referring to FIG. 15, first, the temperature data acquisition circuit 170 of the microcomputer 112 acquires the temperature data from the data center 400 through the network 300 per unit time (e.g., one hour) per year by using the wireless communication module 160 in step S201. In addition, the temperature data acquisition circuit 170 of the microcomputer 112 is also acquire a semi-monthly temperature data throughout the year from the data center 400 in step S202. At this time, the temperature data obtained by the temperature data acquisition circuit 170 includes the temperature data related to temperature of the atmosphere on the ground surface and the temperature data related to the soil temperature.

The power generation amount calculating circuit 171 of the microcomputer 112 is then configured to extract a number of days based on the annual monthly temperature data at each of the atmosphere on the ground surface and the ground. Specifically, the power generation amount calculating circuit 171 extracts several days on the ground surface where temperature differences between temperature of the atmosphere and the soil temperature are small in step S203. Thereafter, the power generation amount calculating circuit 171 calculates a daily power generation amount of the temperature differential power generation module 200 for each of the multiple days extracted, based on the annual hourly the temperature data for each of the atmosphere on the ground surface and the ground in step S204.

Thereafter, the minimum power generation date specifying circuit 172 of the microcomputer 112 identifies the date with the least power generation amount based on the power generation amount calculated in the power generation amount calculating circuit 171 in step S205.

Subsequently, the time interval calculating circuit 173 of the microcomputer 112 calculates the first time interval for stable operation of the wireless communication module 160 based on the power generation amount of the day identified in the minimum power generation date specifying circuit 172 in step S206. In addition, the time interval calculating circuit 173 turns calculate the second time interval for stable operation of the sensor 150 in step S207.

Then, the power supply controller 174 of the microcomputer 112 performs the power supply operation at the first time interval calculated by the time interval calculating circuit 173 to the wireless communication module 160, and performs the power supply operation at the second time interval calculated by the time interval calculating circuit 173 to the sensor 150, in step S208. In other cases, the temperature data is obtained not only for every hour (e.g., 1 hour) throughout the year, but also for every half month throughout the year. Throughout the year, the temperature data is enable utilized for every half month to reduce throughput by the power generation amount calculating circuit 171. Specifically, in this other example of operation, the power generation amount calculating circuit 171 extracts several days with smaller differences between the temperature of the atmosphere on the ground surface and the soil temperature in advance based on the temperature data on a semi-monthly basis throughout the year. It is noticed that in order to identify the lowest days of power generation amount, the power generation amount of all days throughout the year need not be calculate, and that the lowest days of the power generation amount can be easily identified by extracting a plurality of days based on a day with a small difference between the temperature of atmosphere of the ground surface and the soil temperature and calculating only the power generation amount of the plurality of extracted days. Therefore, according to the other operation examples, it is possible to specify the date of the smallest power generation amount while reducing the throughput in the microcomputer 112.

EXAMPLE

Hereinafter, the operation of the microcomputer 112 will be described based on specific examples.

<Prerequisites for Examples>

Figure 16:
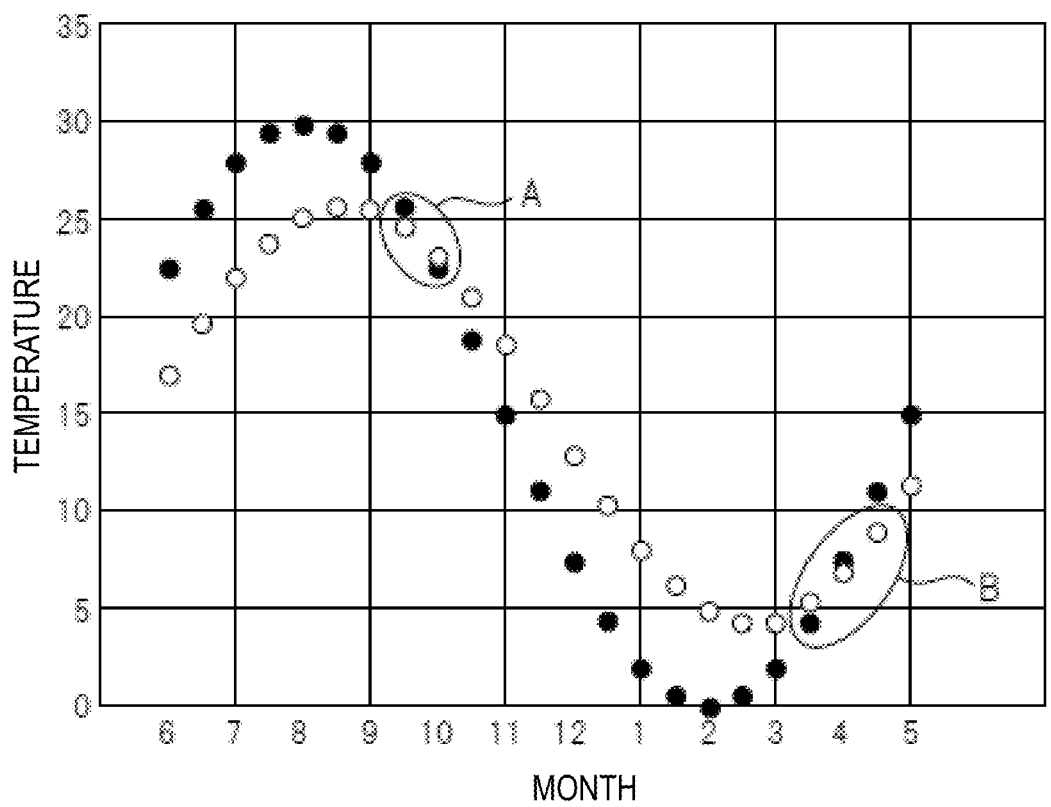
FIG. 16 is a graphical representation of an exemplary temperature data per meniscus over the year obtained in a temperature data acquisition circuit.

FIG. 16 is a diagram illustrating an exemplary temperature data for each half-month over the year acquired by the temperature data acquisition circuit 170. In FIG. 16, the horizontal axis indicates a month, while the vertical axis indicates a temperature. The black circle indicates a temperature of the atmosphere on the ground surface, and a white circle indicates the soil temperature. The temperature differential power generation module 200 generates the greater power generation amount, in case of the greater temperature difference between temperature of the atmosphere on the ground surface and the soil temperature. For example, in a region A or a region B shown in FIG. 16, since the temperature difference between temperature of the atmosphere on the ground surface and the soil temperature is hardly, it is expected that the power generation amount of the month corresponding to these region A and region B is reduced. Therefore, the days with the least power generation amount are likely to be included in the region A or the region B. For this reason, for example, in FIG. 16, only a plurality of days corresponding to the region A or the region B are extracted, and only power generation amount at the extracted date is calculate, so that the days with the least power generation amount can be efficiently identified.

Incidentally, as shown in FIG. 16, for example, from April to September, while the ground surface on the atmosphere of temperature is higher than the soil temperature, from October to March, reversed, the temperature of the atmosphere on the ground surface is lower than the soil temperature. Therefore, considering that the temperature differential power generation module 200 comprising the seebeck element has the polarity, for example, in the temperature differential power generation module 200 having one temperature difference power generating element, the seebeck element, 204 as shown in FIG. 2, it is difficult to generate power throughout the year. That is, if the temperature difference power generating element 204 is configured to generate power when temperature of the atmosphere on the ground surface is higher than the soil temperature, it can generate power from April to September based on FIG. 16. On the other hand, it can be seen that the temperature differential power generation module 200 cannot be generated the power from October to March. Therefore, based on the temperature data shown in FIG. 16, the temperature differential power generation module 200 with only one temperature difference power generating element 204 as shown in FIG. 2 is difficult to generate power throughout the year.

On the other hand, for example, the temperature differential power generation module 200B shown in FIG. 4 includes the temperature difference power generating element 204a and the temperature difference power generating element 204b differing in the polarity from each other. That is, the temperature differential power generation module 200B shown in FIG. 4 has the temperature difference power generating element 204a configured to generate power when temperature of the atmosphere on the ground surface is higher than the soil temperature, and the temperature difference power generating element 204b configured to generate power when temperature of the atmosphere on the ground surface is lower than the soil temperature. Therefore, according to the temperature differential power generation module 200B shown in FIG. 4, power can be generated not only from April to September when the temperature of the atmosphere of the ground surface is higher than the soil temperature, but also from October to March when temperature of the atmosphere on the ground surface is lower than the soil temperature. That is, the temperature differential power generation module 200B shown in FIG. 4, even when showing a temperature change as shown in FIG. 16, can be generated throughout the year. Therefore, in the embodiment described here, it is assumed that the temperature differential power generation module 200B shown in FIG. 4 is adopted.

<Operation of Specific Example>

First, the temperature data acquisition circuit 170 of the microcomputer 112 acquires, for example, a temperature data on a monthly basis throughout the year as shown in FIG. 16 and a temperature data on a hourly basis throughout the year (not shown). Then, the power generation amount calculating circuit 171 of the microcomputer 112 extracts a plurality of days with small temperature differences between the temperature of the ground and the temperature of atmosphere on the ground surface shown in the region A and the region B, for example, based on the annual semi-monthly temperature data (refer to FIG. 16) at each of the temperature data for each of the soil temperature and the temperature of atmosphere on the ground surface. The power generation amount calculating circuit 171 then calculate a daily power generation amount of the temperature differential power generation module 200 for each of the multiple days extracted, based on the annual hourly temperature data for each of the atmosphere on the ground surface and the ground.

Figure 17:
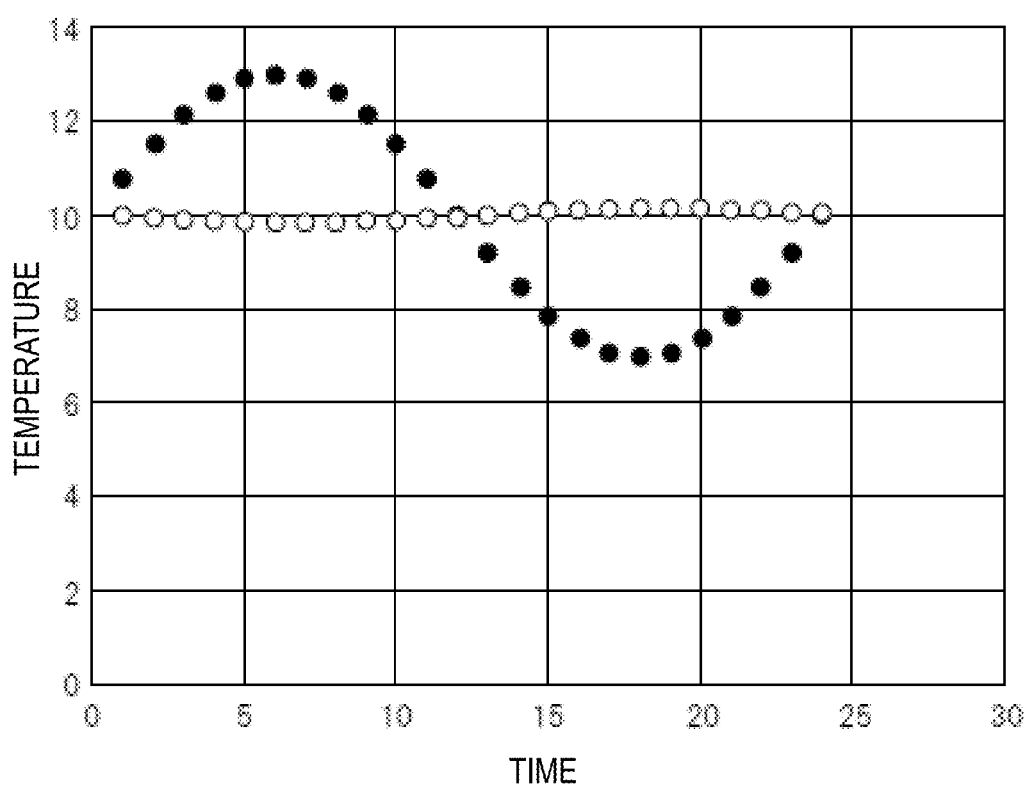
FIG. 17 is a graphical representation of a temperature data per hour of a given day.

For example, FIG. 17 shows the temperature data per unit time of a predetermined day included in a plurality of extracted days. In FIG. 17, the black circle indicates temperature of the atmosphere on the ground surface, and the white circle indicates the soil temperature. Based on FIG. 17, the power generation amount of the predetermined date is calculated. Specifically, the power generation amount calculating circuit 171 calculates temperature differences between the temperature of atmosphere on the ground and the soil temperature for each unit time from the temperature data for each unit time of a predetermined day shown in FIG. 17. Thereafter, the power generation amount calculating circuit 171 turns calculate the power generation amount on a predetermined day based on the calculated temperature differences. Specifically, based on the relationship between temperature differences (° C.) and the power generation amount (mW) shown in FIG. 18, the power generation amount calculating circuit 171 calculates the temperature differential power generation module 200B for each day.

Figure 18:
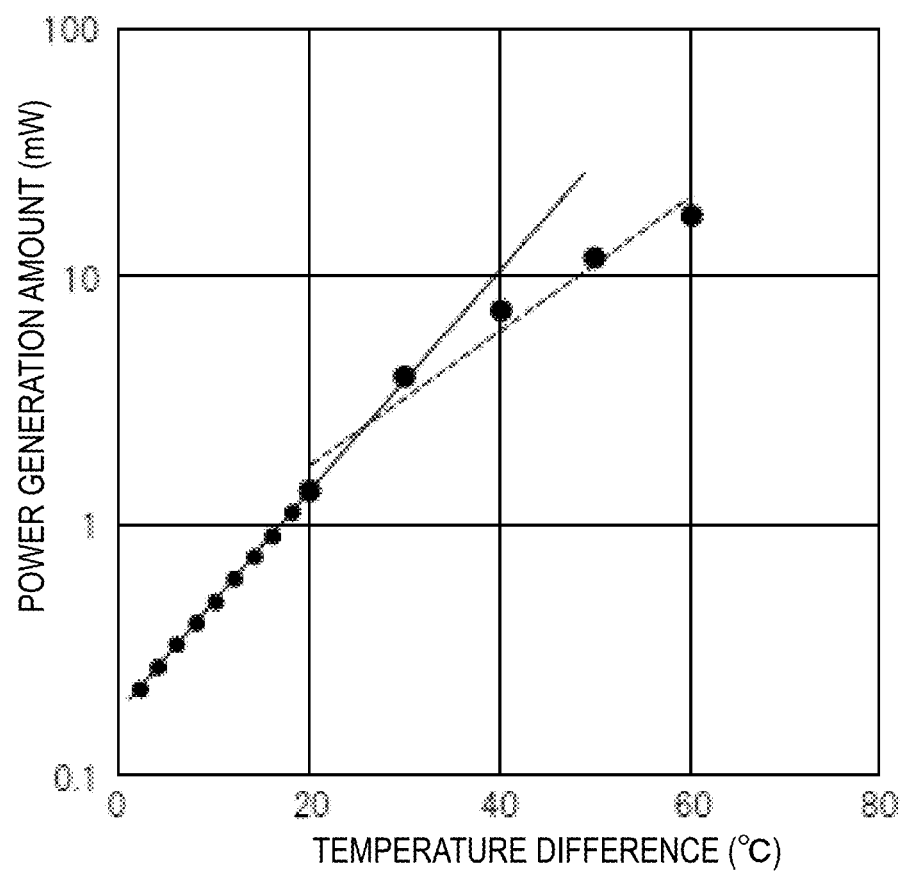
FIG. 18 is a graphical representation of a relationship between temperature differences and power generation amount.

The relationship between temperature differences shown in FIG. 18 and the power generation amount is predetermined by the characteristics of the temperature difference power generating element, the seebeck element, which is a component of the temperature differential power generation module 200B.

Figure 19:
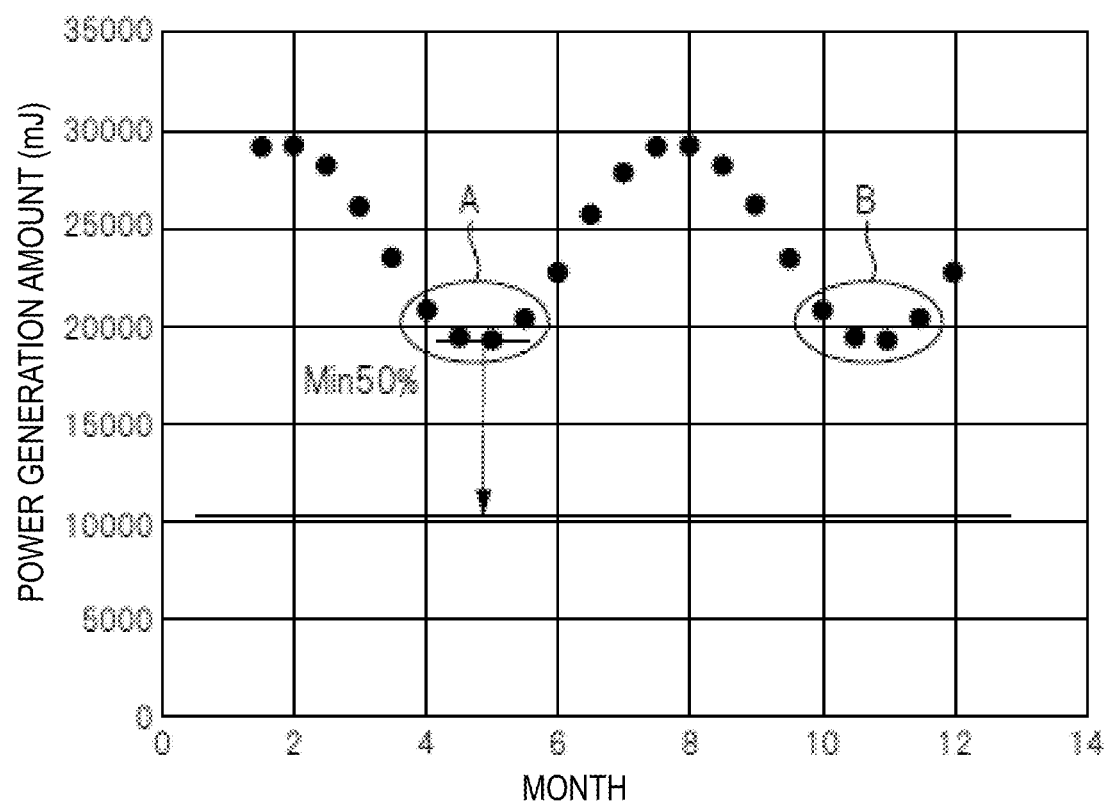
FIG. 19 is a graphical representation of daily power generation amount throughout the year.

FIG. 19 is a graphical representation of the daily power generation amount over the year calculated in the power generation amount calculating circuit 171. Here, in FIG. 19, the daily power generation amount is shown throughout the year. This is shown conceptually, and in this specific example, only power generation amount corresponding to the extracted the region A or the region B is calculated.

The minimum power generation date specifying circuit 172 of the microcomputer 112 then identifies the date with the least power generation amount, for example, based on FIG. 19.

Thereafter, the time interval calculating circuit 173 of the microcomputer 112 is calculates the first time interval for stable operation of the wireless communication module 160 based on the power generation amount of the day identified in the minimum power generation date specifying circuit 172. In addition, the time interval calculating circuit 173 turns calculate the second time interval for stable operation of the sensor 150. Here, in this specific example, for simplicity, the first time interval is shown as an calculate In this embodiment, for example, as shown in FIG. 19, assuming that the power generation amount of the day with the least power generation amount is "20 J" per day and the power dissipated to operate the wireless communication module 160 is within 50% of this power generation amount. Here, "J" means joule. The power consumed to operate the wireless communication module 160 is "10 J" per day. In other words, the reference generated electric power per day of wireless communication module 160 is "10 J". Then, if one transmission power is set to "15 mJ", the number of times of transmission per day is "666 times", and the transmission interval (first time interval) is calculated as "130 sec". Consequently, in this embodiment, the power supply controller 174 of the microcomputer 112 will control the operation of supplying power to the wireless communication module 160 at a transmission interval of "130 sec".

Further, the number of times of transmission is not limited to the above, and may be, for example, about 1 time from 10 to 15 minutes. In this case, the number of times of transmission per day is less than the above, it is possible to reduce the transmission power. This allows the sensor 150 to acquire more data, ensuring that power is supplied to the sensor 150 with reduced power.

In this way, even on days with the lowest power generation amount at the temperature differential power generation module 200B, the power consumed by the wireless communication module 160 can be covered. Therefore, the wireless communication module 160 can be stably operated.

In present embodiment, the temperature data is downloaded from the data sensor 400 to the IoT edge module in units of hours throughout the year, and the analysis process is performed by the microcomputer 112. For example, when the number of the IoT edge module is enormous, if the analysis process in all the IoT edge module is performed by the data center 400, the burden on the data center 400 becomes large. In this regard, since present embodiment performs the analysis process in a distributed manner in each of a plurality of the IoT edge module, it is possible to advantageously reduce the burden on the data center 400. In particular, the configuration of present embodiment is enable when the number of installed the IoT edge module becomes enormous.

Fourth Modified Example

In the above embodiment, the microcomputer 112 which is a component of the IoT edge module 100, performs the power supply operation to the wireless communication module 160 at the first time interval set based on the power generation amount at the lowest day power generation amount of the temperature differential power generation module 200. And the microcomputer 112 performs the power supply operation to the sensor 150 at the second time interval set based on the power generation amount at the lowest day at the temperature differential power generation module 200. In this situation, the power consumed by the microcomputer 112 is increased because the throughput at the microcomputer 112 is increased. This means that the IoT edge module 100 incorporating the microcomputer 112 consumes a large amount of power.

Therefore, the present fourth modified example is devised from the viewpoint of reducing the power consumed by the the IoT edge module 100. Specifically, in the present fourth modified example, most of the treatments described above are performed in the data center 400. Hereinafter, the present fourth modified example will be described.

Figure 20:
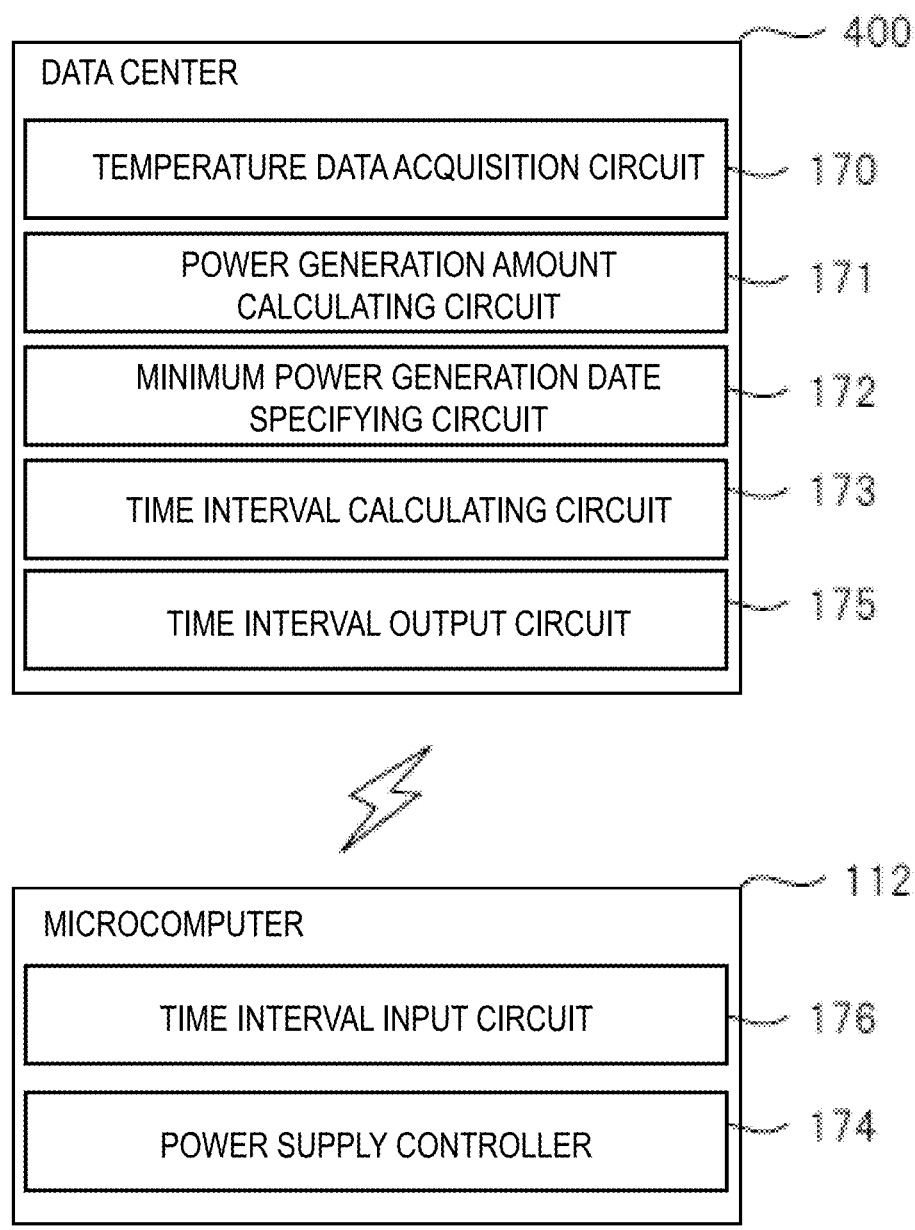
FIG. 20 is a functional block diagram showing configurations of a data center and a microcomputer.

FIG. 20 is a functional diagram showing the configurations of the data center and the microcomputer in the present fourth modified example. In FIG. 20, the data center 400 has the temperature data acquisition circuit 170, the power generation amount calculating circuit 171, the minimum power generation date specifying circuit 172, the time interval calculating circuit 173, and a time interval output circuit 175. Thus, the data center 400 calculates the first time interval and the second time interval based on the power generation amount for the day with the least power generation amount at the temperature differential power generation module 200. The calculated the first time interval and the second time interval are then output from the data center 400 to the microcomputer 112.

On the other hand, in FIG. 20, the microcomputer 112 includes a time interval input circuit 176 and the power supply controller 174. In this way, the microcomputer 112 can input data relating to the first time interval and the second time interval output from the data center 400. And the microcomputer 112 can control the power supply operation to the wireless communication module 160 with the input first time interval, and can control the power supply operation to the sensor 150 with the input the second time interval.

Figure 21:
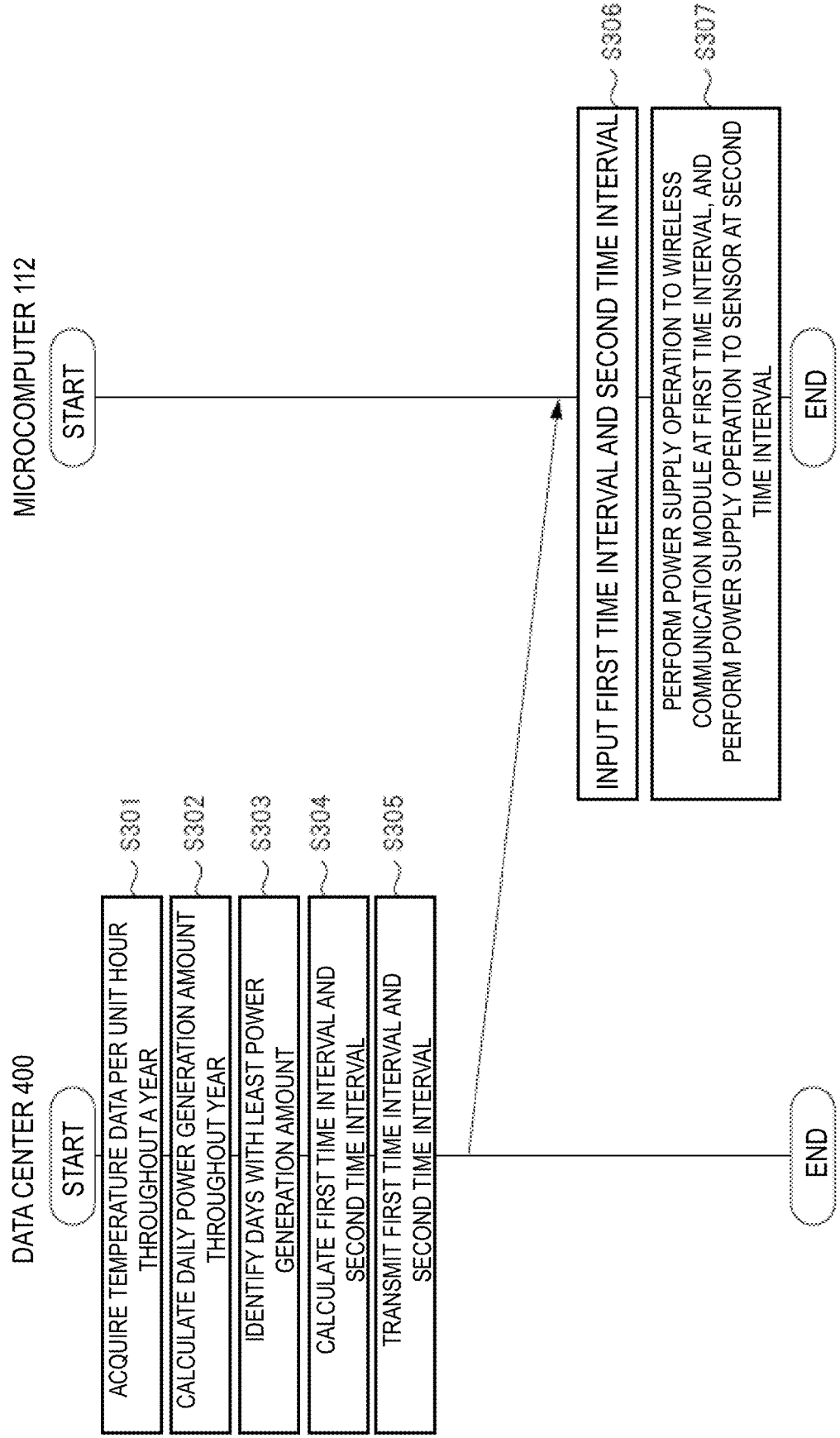
FIG. 21 is a flowchart illustrating an operation of a data center and a microcomputer.

FIG. 21 is a flow chart for explaining the operation of the data center and the microcomputer in the present fourth modified example. As shown in FIG. 21, in the data center 400, the temperature data acquisition circuit 170 acquires the hourly temperature data throughout the year in step S301.

The power generation amount calculating circuit 171 then calculate the daily power generation amount throughout the year based on hourly temperature data throughout the year in step S302. Thereafter, the minimum power generation date specifying circuit 172 identifies the days with the least power generation amount based on daily power generation amount throughout the year in step S303. The time interval calculating circuit 173 then calculate the first time interval and the second time interval based on the power generation amount of the day with the least power generation amount in step S304. The time interval output circuit 175 transmits the calculated first time interval and the second time interval to the microcomputer 112 built in the IoT edge module 100 via the network 300 in S305.

Next, as shown in FIG. 21, in the microcomputer 112, the time interval input circuit 176 inputs data related to the first time interval and the second time interval data transmitted from the data center 400 in S306. Thereafter, the power supply controller 174 performs the power supply operation to the wireless communication module 160 at the first time interval received from the data center 400, and performs the power supply operation to the sensor 150 at the second time interval received from the data center 400 in step S307.

In this way, in this fourth modified example, by using the data center 400 in enable, while reducing the power dissipation by reducing the throughput at the microcomputer 112, based on the power generation status of the temperature differential power generation module 200, the wireless communication module 160 and the sensor 150 it is possible to realize power supply operation idea.

Fifth Modified Example

The technical philosophy in the above-described embodiment is determine philosophy of the power supply operation to the wireless communication module 160 and the sensor 150 based on the temperature data provided in advance. According to this technical idea, in the IoT edge module 100, even if the power generation status of the temperature differential power generation module 200 to which the IoT edge module 100 is connected is not directly grasped, the power generation status of the temperature differential power generation module 200 can be grasped on the basis of the temperature data provided in advance.

However, according to this technical idea, if the temperature data provided in advance from the data center 400 does not accurately reflect temperature of the land where the IoT edge module 100 is actually installed, the power generation status of the temperature differential power generation module 200 may not be accurately grasped. In such cases, it may not be possible to properly determine the power supply operation to the wireless communication module 160 and the sensor 150.

In this regard, this fifth modified example describes determine technical philosophy of the power supply operation to the wireless communication module 160 and the sensor 150 by directly grasping power generation status of the temperature differential power generation module 200 that supplies power to IoT edge module 100 without using the temperature data provided in advance from data center 400.

Figure 22:
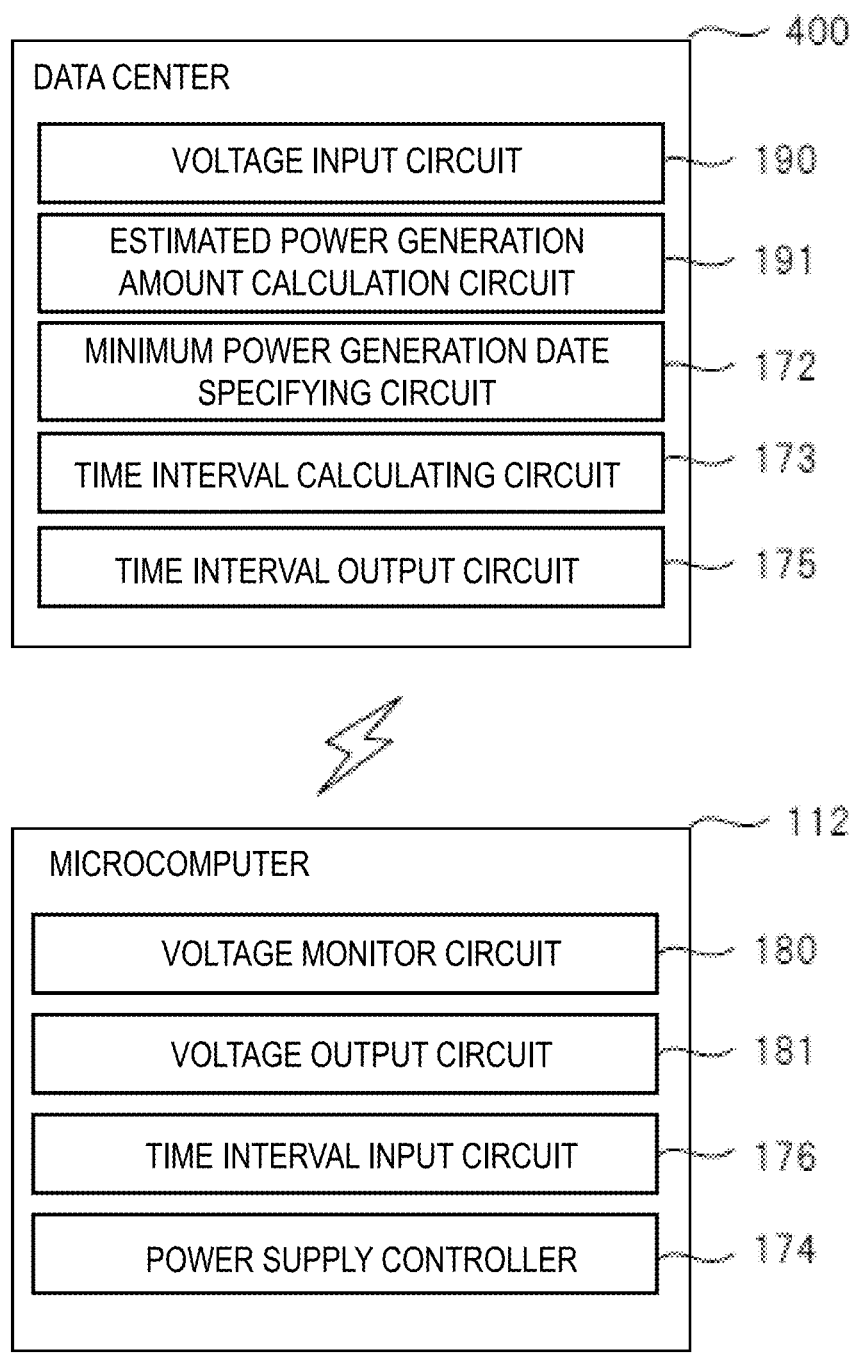
FIG. 22 is a functional block diagram showing configurations of a data center and a microcomputer.

FIG. 22 is a functional diagram showing the configurations of the data center and the microcomputer in the present fifth modified example. First, the functional configuration of the microcomputer 112 will be described.

In FIG. 22, the microcomputer 112 includes a voltage monitor circuit 180, a voltage output circuit 181, the time interval input circuit 176, and the power supply controller 174.

The voltage monitor circuit 180, for example, is configured to monitor the voltage value of the power storage capacitor 120 shown in FIG. 8. For the sake of simplicity, the present fifth modified example assumes that only the power storage capacitor 120 exists as the power storage device included in the IoT edge module 100. In this instance, the power supplied from the temperature differential power generation module 200 is stored only in the power storage capacitor 120. Therefore, by monitoring the voltage value of the power storage capacitor 120, it is believed that the power generation amount at the temperature differential power generation module 200 can be grasped.

The voltage output circuit 181 is configured to be able to transmit data relating to the voltage value of the power storage capacitor 120 being monitored by the voltage monitor circuit 180 to the data center 400.

Then, the microcomputer 112 includes the time interval input circuit 176 and the power supply controller 174. As a result, the microcomputer 112 is configured to input data relating to the first time interval and the second time interval output from the data center 400, perform the power supply operation to the wireless communication module 160 with the input first time interval, and perform the power supply operation to the sensor 150 with the input second time interval.

Next, the functional configuration of the data center 400 will be described.

The data center 400 includes a voltage input circuit 190, a estimated power generation amount calculation circuit 191, the minimum power generation date specifying circuit 172, the time interval calculating circuit 173, and the time interval output circuit 175.

The voltage input circuit 190 is configured to receive data relating to the voltage value of the power storage capacitor 120 transmitted from the voltage output circuit 181 of the microcomputer 112.

The estimated power generation amount calculation circuit 191 is configured to estimate power generation amount of the temperature differential power generation module 200 based on the data relating to the voltage value of the power storage capacitor 120 received by the voltage input circuit 190. That is, since the power generated by the temperature differential power generation module 200 is accumulated in the power storage capacitor 120. For example, the power generation amount of the temperature differential power generation module 200 can be estimated from the voltage change of the power storage capacitor 120. Here, the estimated power generation amount calculation circuit 191 may, for example, be configured to estimate the power generation amount with a pre-programmed algorithms or be configured to estimate the power generation amount using the artificial intelligence.

For the sake of simplicity, this fifth modified example assumes a configuration in which only the power storage capacitor 120 is present as the power storage device included in the IoT edge module 100. However, the technical philosophy of the present fifth modified example is not limited thereto, and can be applied to a configuration including not only the power storage capacitor 120 but also the secondary battery 130 to the IoT edge module 100. In this instance, the estimated power generation amount calculation circuit 191 estimates the power generation amount of the temperature differential power generation module 200 based on the combination voltage change of the power storage capacitor 120 and the voltage change of the secondary battery 130.

Then, the data center 400 has the minimum power generation date specifying circuit 172, the time interval calculating circuit 173, and the time interval output circuit 175. This allows, the data center 400 can calculate the first time interval and the second time interval based on the power generation amount on the day with the lowest power generation amount at the temperature differential power generation module 200. After that, the calculated first time interval and the second time interval information is output from the data center 400 to the microcomputer 112.

Figure 23:
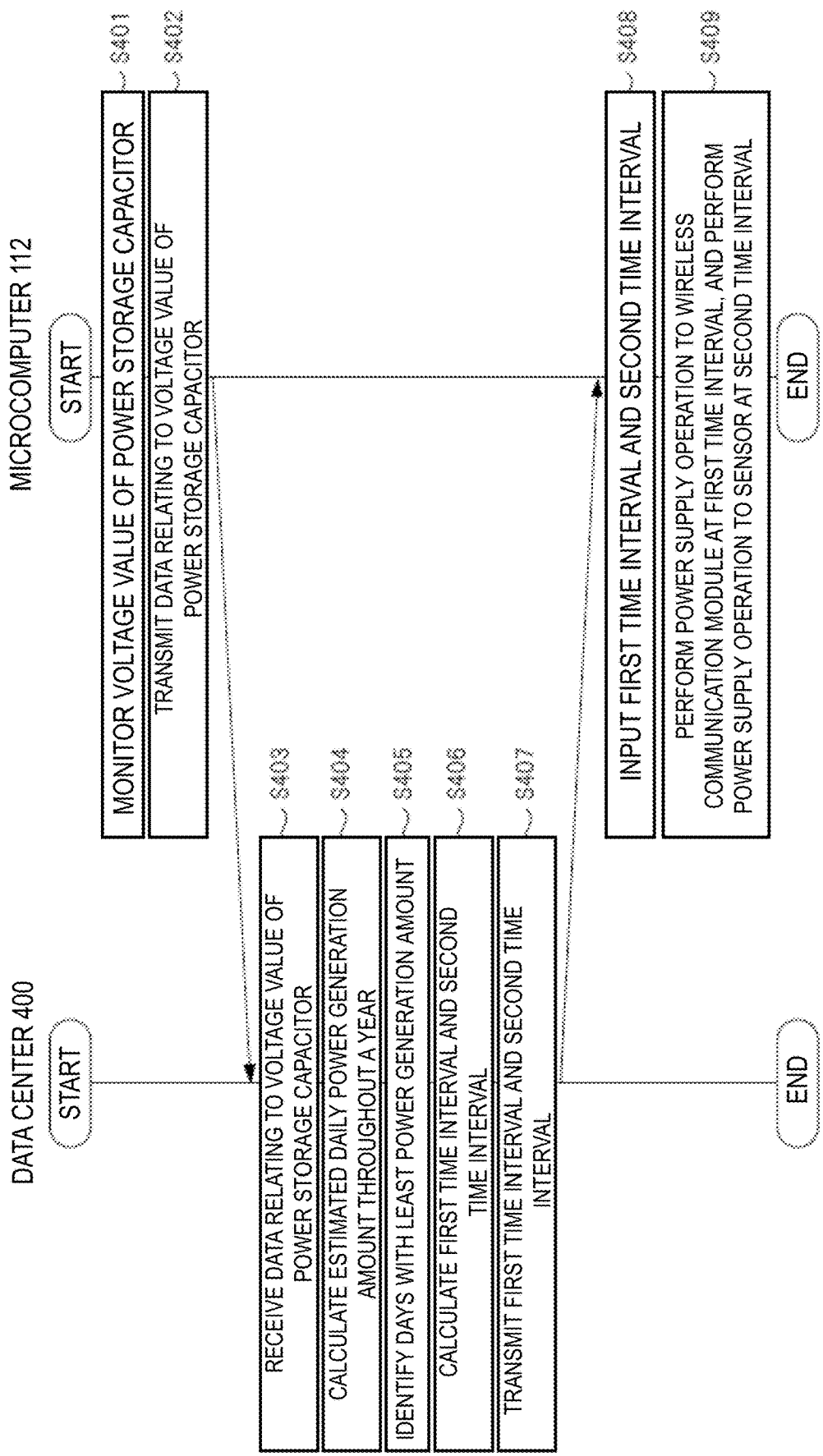
FIG. 23 is a flowchart illustrating an operation of a data center and a microcomputer.

FIG. 23 is a flow chart for explaining the operation of the data center and the microcomputer in the present fifth modified example. As shown in FIG. 23, in the voltage monitor circuit 180 of the microcomputer 112, the voltage value of the power storage capacitor 120 is monitored in step S401. Then, the voltage output circuit 181 of the microcomputer 112 transmits data relating to the voltage value of monitored the power storage capacitor 120 to the data center 400 in step S402. Here, the data to be transmitted is not limited to data relating to the voltage value, it may be the voltage value of power storage capacitor 120.

Next, the voltage input circuit 190 of the data center 400 receives the data relating to the voltage value of the power storage capacitor 120 transmitted from the voltage output circuit 181 of the microcomputer 112 in step S403. Then, the estimated power generation amount calculation circuit 191 is turned calculate estimated daily power generation amount throughout the year of the temperature differential power generation module 200 based on the data relating to the voltage value of the power storage capacitor 120 received by the voltage input circuit 190 in step S404. Thereafter, the minimum power generation date specifying circuit 172 identifies the date with the least power generation amount based on estimated the power generation amount calculated in the estimated power generation amount calculation circuit 191 in step S405. The time interval calculating circuit 173 then calculate the first time interval and the second time interval based on the power generation amount of the day with the least power generation amount in step S406. The time interval output circuit 175 outputs the calculated first time interval and the second time interval to the microcomputer 112 of the IoT edge module 100 in step S407.

Subsequently, the time interval input circuit 176 of the microcomputer 112 receives data related to the first time interval and the second time interval transmitted from the data center 400 in step S408. Thereafter, the power supply controller 174 of the microcomputer 112 performs the power supply operation to the wireless communication module 160 based on the first time interval received from the data center 400. And the power supply controller 174 performs the power supply operation to the sensor 150 based on the second time interval received from the data center 400 in step S409.

In this way, without using the temperature data provided in advance from the data center 400, by grasping the power generation status of the temperature differential power generation module 200 directly based on the voltage value of the power storage capacitor 120, it is possible to determine the power supply operation to the wireless communication module 160 and the sensor 150.

Incidentally, in this fifth modified example, the power generation status of the temperature differential power generation module 200 is directly grasped based on the voltage value of the power storage capacitor 120. In this regard, for example, rather than the voltage value of the power storage capacitor 120, it is also conceivable to grasp the power generation status of the temperature differential power generation module 200 based on the temperature data measured at the temperature sensor included in the sensor 150.

However, the power generation status of the temperature differential power generation module 200 must be calculate based on the temperature data. Therefore, according to the present fifth modified example, while reducing the operation required by the microcomputer 112, it can be said that it is a useful technical philosophy in that it can be directly grasped the power generation status of the temperature differential power generation module 200.

Sixth Modified Example

Figure 24:
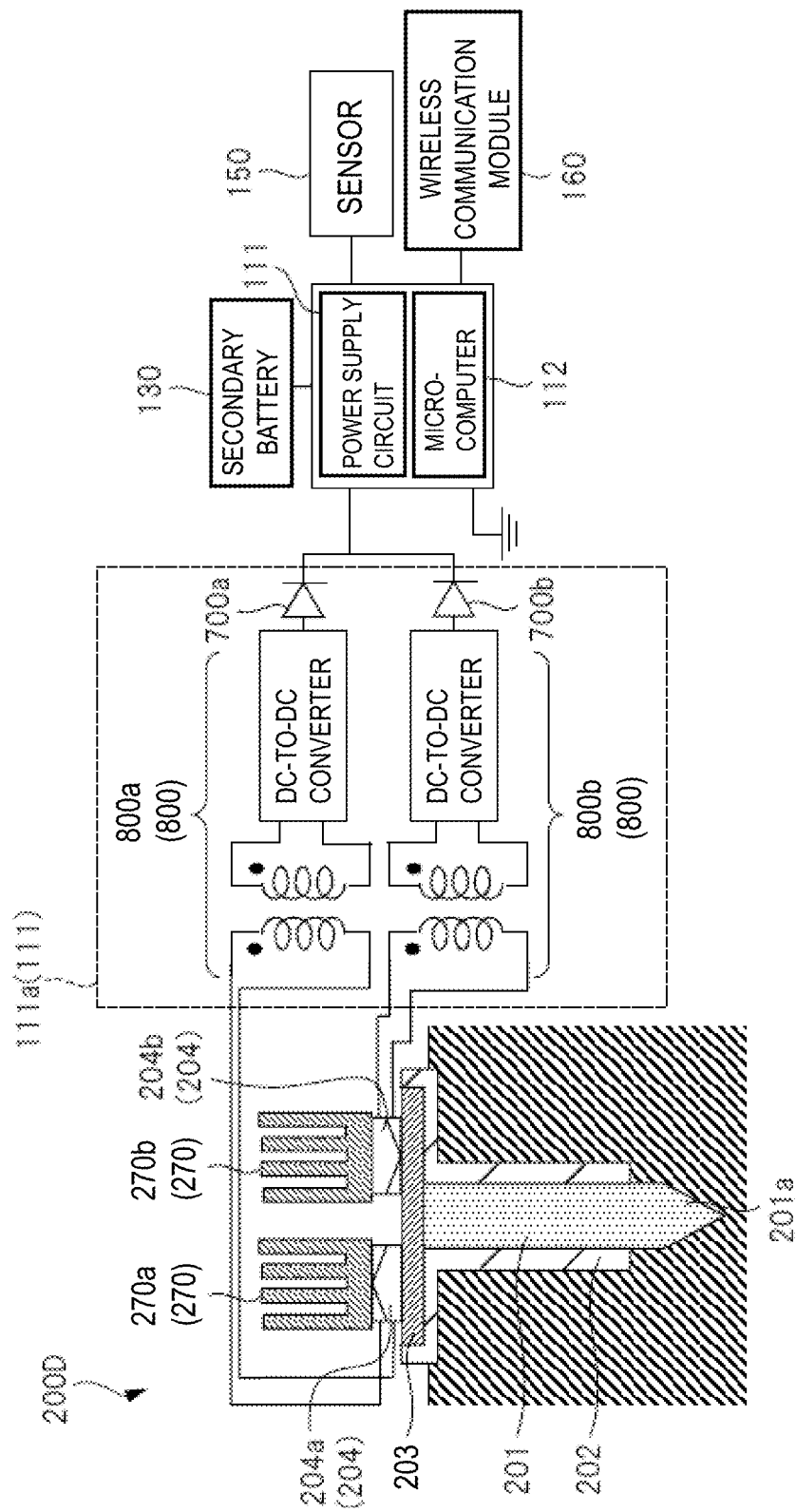
FIG. 24 is a diagram showing a temperature differential power generation module and an IoT edge module.

FIG. 24 is a diagram showing the temperature differential power generation module and the IoT edge module.

In FIG. 24, a temperature differential power generation module 200D includes the heat conductive material 201 embedded so as to pierce ground, the coating material 202 covering the heat conductive material 201, the distal end portion 201a exposed from the coating material 202, and a plate-shaped heat conductive material 203 contacting the heat conductive material 201. The plate-shaped heat conductive material is also called a plate part. The temperature differential power generation module 200D includes the temperature difference power generating element 204a and the temperature difference power generating element 204b provided on the plate-shaped heat conductive material 203. The temperature differential power generation module 200D further comprises a fin structure 270a in contact with the temperature difference power generating element 204a, and a fin structure 270b in contact with the temperature difference power generating element 204b. Here, the temperature difference power generating element 204a and the temperature difference power generating element 204b are arranged so that the polarity is reversed.

The temperature differential power generation module 200D thus configured has fin structures 270 having a large surface area. The fin structure 270, since the contact area with the atmosphere is increased, by providing the fin structure 270 so as to be in direct contact with the temperature difference power generating element 204, efficiently heat absorbing the ground surface of temperature on the fin structure 270, the temperature difference power generating element 204 temperature it is possible to efficiently convey. As a result, according to the temperature differential power generation module 200D, since a large temperature differential can be maintained, power generation can be efficiently performed. Since the temperature differential power generation module 200D has the temperature difference power generating element 204a and the temperature difference power generating element 204b of opposite polarity, the power generation can be efficiently performed not only when temperature of the atmosphere on the ground surface is higher than the soil temperature but also when temperature of the atmosphere on the ground surface is lower than the soil temperature.

Next, a power supply circuit 111a includes a booster circuit 800a electrically connected to the temperature difference power generating element 204a, and a backflow prevention diode 700a connected to the outputs of the booster circuit 800a. Similarly, the power supply circuit 111a includes a booster circuit 800b electrically connected to the temperature difference power generating element 204b, and a backflow preventing diode 700b connected to the output of the booster circuit 800b. At this time, each of the booster circuit 800a and the booster circuit 800b can be comprised of, for example, combinations of transformers and DC-to-DC converters.

Here, for example, the temperature difference power generating element is the polarity of temperature difference between the fin-structure and the plate-shaped heat conductive material, the polarity of the electromotive force is also reversed. Therefore, a configuration is conceivable in which two booster circuits (transformers) of the opposite polarity are connected in parallel to this one temperature difference power generating element on the assumption that one temperature difference power generating element is used instead of using two temperature difference power generating elements with the polarity reversed as shown in FIG. 24, and the backflow prevention diode is connected to the respective outputs of the two booster circuits. That is, for example, when temperature difference between the fin structure and the plate-shaped heat conductive material 203 is a positive temperature difference, while using the output from the booster circuit of one of the two booster circuits, when temperature difference between the fin structure and the plate-shaped heat conductive material 203 is a negative temperature difference, it is conceivable to configure to use the output from the booster circuit of the other one of the two booster circuits.

Even in this configuration, power generation can be continued as long as there is a temperature differential between the fin-structure and the plate-shaped heat conductive material, regardless of the polarity of temperature differential. According to this configuration, unlike the temperature differential power generation module 200D shown in FIG. 24, since only one temperature difference power generating element is used, it is possible to obtain advantages of miniaturization of the temperature differential power generation module which is apt to become large in size.

However, in this configuration, two booster circuits connected reversely to one temperature difference power generating element is connected. Therefore, as a result of boosting operation is performed even in the booster circuit that does not contribute to power generation of the two booster circuits, loss of power is generated. In this regard, if the power generation amount is weak, such as temperature differential power generation, the loss of power as described above may be a fatal disadvantage. That is, in the temperature differential power generation module of this configuration, it may be difficult to secure stable autonomous the IoT edge module operation.

On the other hand, in the configuration shown in FIG. 24, the temperature difference power generating element 204a and the temperature difference power generating element 204b having the opposite polarity are provided. And one booster circuit 800a and one backflow prevention diode 700a are connected to the temperature difference power generating element 204a. And one booster circuit 800b and one backflow prevention diode 700b are connected to the temperature difference power generating element 204b. In this case, the respective temperature difference power generating elements 204, since only one booster circuit 800 rather than two is connected, power loss is minimized. This means that the configuration shown in FIG. 24 is useful for temperature power generation where the power generation amount is weak. Therefore, for example, by adopting the configuration shown in FIG. 24, and employing the microcomputer 112, including the field effect transistors formed on the SOTB substrate, having excellent low power consuming operation, it is possible to promote the operation of the autonomous the IoT edge module by temperature differential power generation.

However, in the configuration shown in FIG. 24, since the temperature difference power generating element 204a and the temperature difference power generating element 204b are provided, the size of the temperature differential power generation module 200D is increased. However, since the installation site is a site having any installation area such as agricultural land, the enlargement of the temperature differential power generation module 200D does not become apparent as problems. More importantly, the temperature differential power generation module is more efficient in generating electricity. In this regard, in the configuration shown in FIG. 24, the power generation efficiency can be improved by the synergistic effect of ensuring temperature differences by using the fin structure 270 and reducing power loss by connecting only one booster circuit 800 to one temperature difference power generating element 204. From this, it can be seen that the configuration shown in FIG. 24 is beneficial in terms of being able to promote the autonomous operation of the IoT edge module.

Seventh Modified Example

The greatest challenge of temperature differential power generation due to temperature difference between temperature of the atmosphere on the ground surface and the soil temperature is that when the atmosphere temperature changes rapidly, temperature difference between the fin structures 270 and the plate-shaped heat conductive material 203, 203E becomes small and it becomes difficult to generate power. In this seventh modified example, the power generation efficiency of temperature differential power generation is improved by devising ways to deal with this problem.

Figure 25:
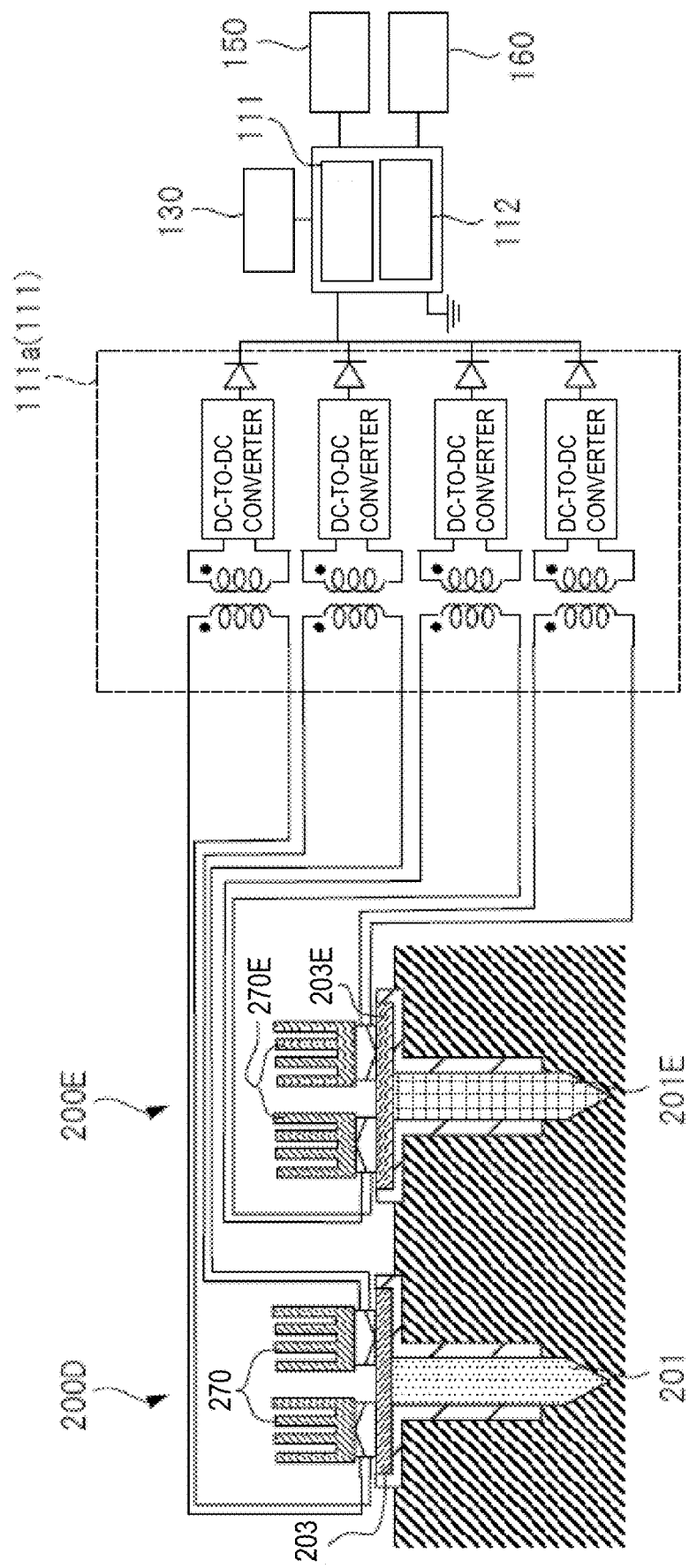
FIG. 25 is a diagram showing a temperature differential power generation module and an IoT edge module.

FIG. 25 is a diagram showing the temperature differential power generation module and the IoT edge module.

In FIG. 25, the temperature differential power generation module in this seventh modified example includes the temperature differential power generation module 200D and a temperature differential power generation module 200E. Here, the heat conductive material 201, which is a component of the temperature differential power generation module 200D, and a heat conductive material 201E, which is a component of the temperature differential power generation module 200E, differ from each other in thermal conductivity or thermal capacity.

For example, the thermal conductivity of the heat conductive material 201 is smaller than the thermal conductivity of the heat conductive material 201E. Specifically, the heat conductive material 201 is made of aluminium, Al, having a small thermal conductivity. On the other hand, the heat conductive material 201E is made of Cu having a high thermal conductivity.

In this case, the larger the thermal conductivity heat conductive material 201E is closer to the soil temperature than the smaller thermal conductivity 201. In other words, the lower thermal conductivity heat conductive material 201 is closer to temperature of the atmosphere on the ground surface than the higher thermal conductivity heat conductive material 201E. Temperature of the heat conductive material 201 and temperature of the heat conductive material 201E differ from each other.

Figure 26:
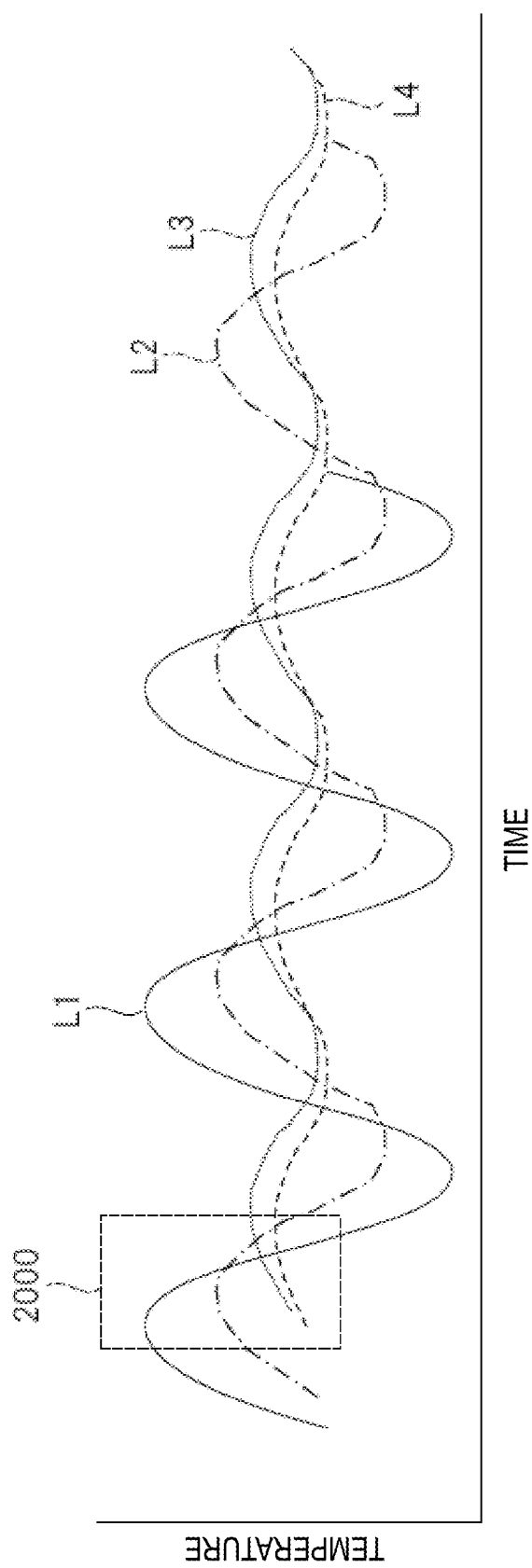
FIG. 26 is a graphical representation of a temperature change in a components of a temperature differential power generation module.

FIG. 26 is a graphical representation of temperature change in the components of the temperature differential power generation module.

The vertical axis indicates temperature. On the other hand, the horizontal axis represents time.

In FIG. 26, a graph "L1" is a graph showing a temperature change of the fin structures (270, 270E), and a graph "L2" is a graph showing a temperature change of the plate-shaped heat conductive material 203. A graph "L3" is a graph showing temperature change of the plate-shaped heat conductive material 203E, and a graph "L4" is a graph showing temperature change of the soil. As shown in FIG. 26, in the present seventh modified example, since the heat conductive material 201 and the heat conductive material 201E are made of materials having different thermal conductivity, temperature change of the plate-shaped heat conductive material 203 and temperature change of the plate-shaped heat conductive material 203E are different.

Figure 27:
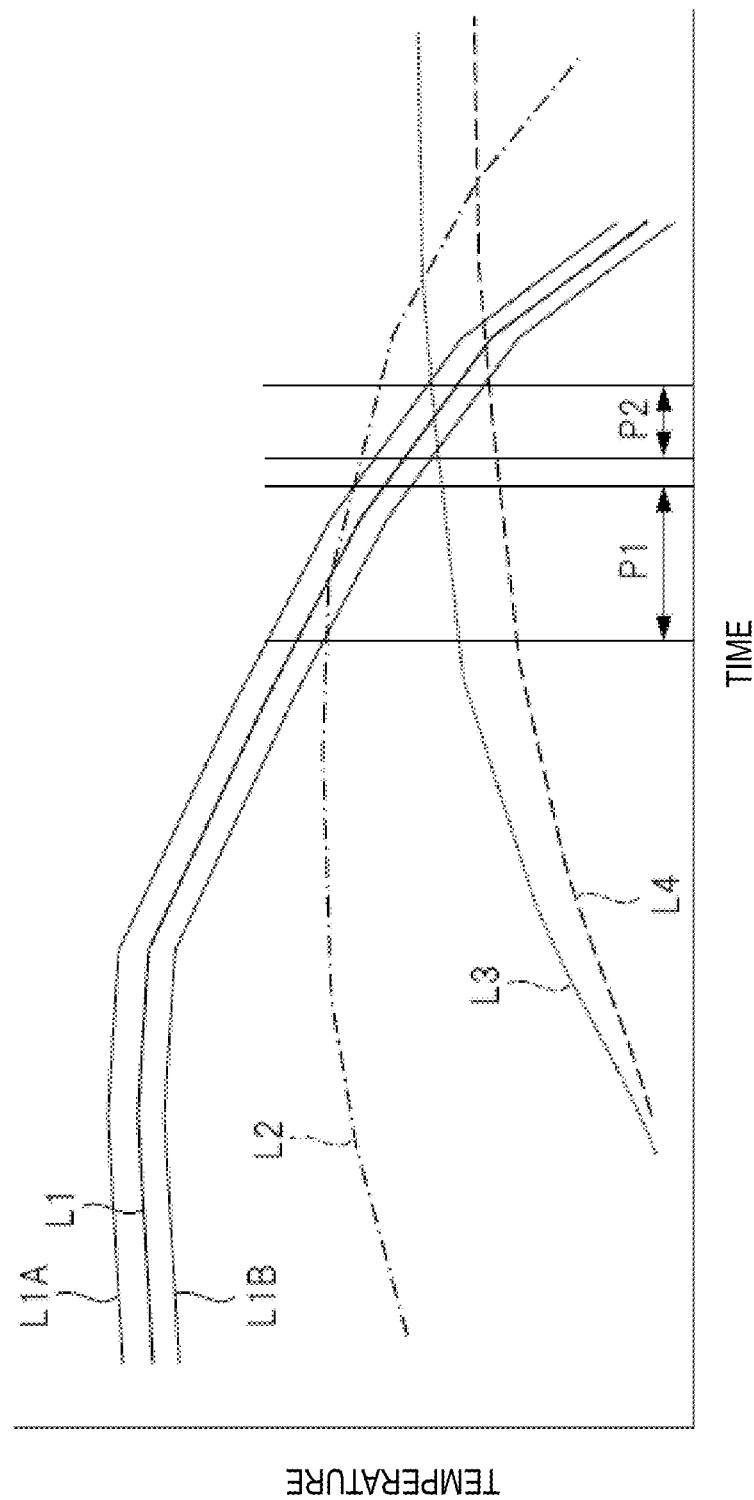
FIG. 27 is an enlarged view of a partial region of FIG. 26.

FIG. 27 is an enlarged view of a region 2000 shown in FIG. 26.

In FIG. 27, a graph "L1A" is a graph showing a temperature change of temperature +2° C. of the fin structures (270, 270E) and a graph "L1B" is a graph showing a temperature change of temperature −2° C. of the fin structures (270, 270E).

In the present seventh modified example, since the thermal conductivity of the plate-shaped heat conductive material 203 is small, temperature of the plate-shaped heat conductive material 203 is pulled to temperature of the fin structure 270. In contrast, because of the high thermal conductivity of the heat conductive material 201E, temperature of heat conductive material 201E is pulled to temperature of the soil. As a result, as shown in FIG. 27, temperature change "L2" of the plate-shaped heat conductive material 203 in contact with the heat conductive material 201 differs from temperature change "L3" of the plate-shaped heat conductive material 203E in contact with the heat conductive material 201E.

Here, in FIG. 27, a period P1 indicates a "no-power generation period" in which temperature of the atmosphere changes abruptly, and as a result of temperature difference in the temperature differential power generation module 200D becoming extremely small, power generation is not possible. A period P2 indicates the "no-power generation period" in which temperature of the atmosphere rapidly changes, and as a result, temperature differential in the temperature differential power generation module 200E becomes extremely small, so that power cannot be generated.

Importantly, in this seventh modified example, temperature change of "L2" and temperature change of "L3" differ, so that the no-power generation period P1 in the temperature differential power generation module 200D and the no-power generation period P2 in the temperature differential power generation module 200E are temporally shifted.

Thus, for example, in the no-power generation period P1 of the temperature differential power generation module 200D, power can be generated by the temperature differential power generation module 200E. On the other hand, in the no-power generation period P2 of the temperature differential power generation module 200E, power can be generated by the temperature differential power generation module 200D. That is, according to the present seventh modified example, it is possible to suppress that both the temperature differential power generation module 200D and the temperature differential power generation module 200E cannot generate power as a result of the time-shifted the no-power generation period P1 and the time-shifted the no-power generation period P2. In other words, in the present seventh modified example, when temperature of the atmosphere rapidly changes, temperature differences between the fin structures 270 and the plate-shaped heat conductive materials (203, 203E) become very small, and one of the temperature differential power generation module 200D and the temperature differential power generation module 200E is set to be capable of generating electric power.

As described above, the basic idea in this seventh modified example is to temporally shift the no-power generation period P1 and the no-power generation period P2, and in order to realize this basic idea, the thermal conductivity of the heat conductive material 201 and the thermal conductivity of the heat conductive material 201E are different from each other. As a result, temperature characteristics of the temperature differential power generation module 200D and temperature characteristics of the temperature differential power generation module 200E can be made different from each other, so that the no-power generation period (P1) and the no-power generation period (P2) can be temporally shifted from each other. Consequently, according to this seventh modified example, power generation efficiency can be improved.

Eighth Modified Example

<Basic Concept>

The temperature difference power generating element is sandwiched between the fin structure and the plate-shaped heat conductive material, and is configured to generate power based on temperature differential between temperature of the fin structure and temperature of the plate part. Here, the greater temperature differential, the greater power generation amount at the temperature difference power generating element. Therefore, it is desirable to maintain a temperature differential between the fin structures and plate-shaped heat conductive material. However, in accordance with the laws of nature, temperature difference between the fin structure and the plate-shaped heat conductive material is shifted through the temperature difference power generating element to a thermal equilibrium condition in which temperature of the fin structure and temperature of the plate-shaped heat conductive material are equal. For example, if temperature of the fin structure is higher than temperature of the plate-shaped heat conductive material, heat will eventually reach thermal equilibrium by transferring heat from the fin structure with higher temperature to the plate-shaped heat conductive material with lower temperature through the temperature difference power generating element. In thermal equilibrium, there is no temperature difference between the finned structure and the plate-shaped heat conductive material. Therefore, it is difficult to generate power with the temperature difference power generating element. Therefore, as the temperature difference power generating element, it is desirable to have a property of thermal conductivity is as small as possible. The low thermal conductivity means that the heat is not easily transferred. In this case, the relaxation time until temperature of the fin structure becomes equal to temperature of the plate-shaped heat conductive material through the temperature difference power generating element can be lengthened when there is a temperature difference between the fin structure and the plate-shaped heat conductive material. In other words, by reducing the thermal conductivity of the temperature difference power generating element, the temperature difference power generating element's potential for power generation at the start of power generation can be maintained at a higher level by increasing the relaxation times to thermal equilibrium.

Therefore, we first discuss the thermal conduction mechanism of the temperature difference power generating element.

The temperature difference power generating element is comprised of semiconducting materials with crystalline structures. Therefore, thermal conduction of the temperature difference power generating element can be divided mainly into thermal conduction by lattice oscillation (phonon) and thermal conduction by charge carriers (electrons or holes). In this regard, the present inventors have focused on the fact that while the thermal conduction by phonons is difficult to control, the thermal conduction by charge carriers can be controlled. That is to say, the basic philosophy of this eighth modified example is the philosophy of reducing the thermal conduction of the temperature difference power generating element by controlling the thermal conduction by charge carriers.

Specifically, the present inventors have noticed that the thermal conductivity of the non-energized state than the thermal conductivity of the energized state is reduced. In other words, when energized, a large number of charge carriers flow in the temperature difference power generating element. Since this means that a large number of charge carriers are responsible for heat, the thermal conductivity of the temperature difference power generating element increases as the effect of heat conduction by charge carriers increases. In other words, this means that power is wasted by Joule heat of the load components of DC-to-DC converters and transformers even when temperature differential energy is turned off, even when the backflow prevention diode is turned off.

On the other hand, in the de-energized condition, there are almost no charge carriers flowing in the temperature difference power generating element. This means that, in the de-energized state, the minority number of charge carriers serves as a carrier for heat. Therefore, the thermal conductivity of the temperature difference power generating element is reduced by reducing the effect of thermal conduction by the charge carriers. In this way, the thermal conductivity of the temperature difference power generating element in the de-energized state is smaller than the thermal conductivity of the temperature difference power generating element in the energized state. The idea of using this mechanism is the basic idea of this eighth modified example. Hereinafter, a concrete embodiment in which the basic idea is embodied will be described.

<Specifically>

Figure 28:
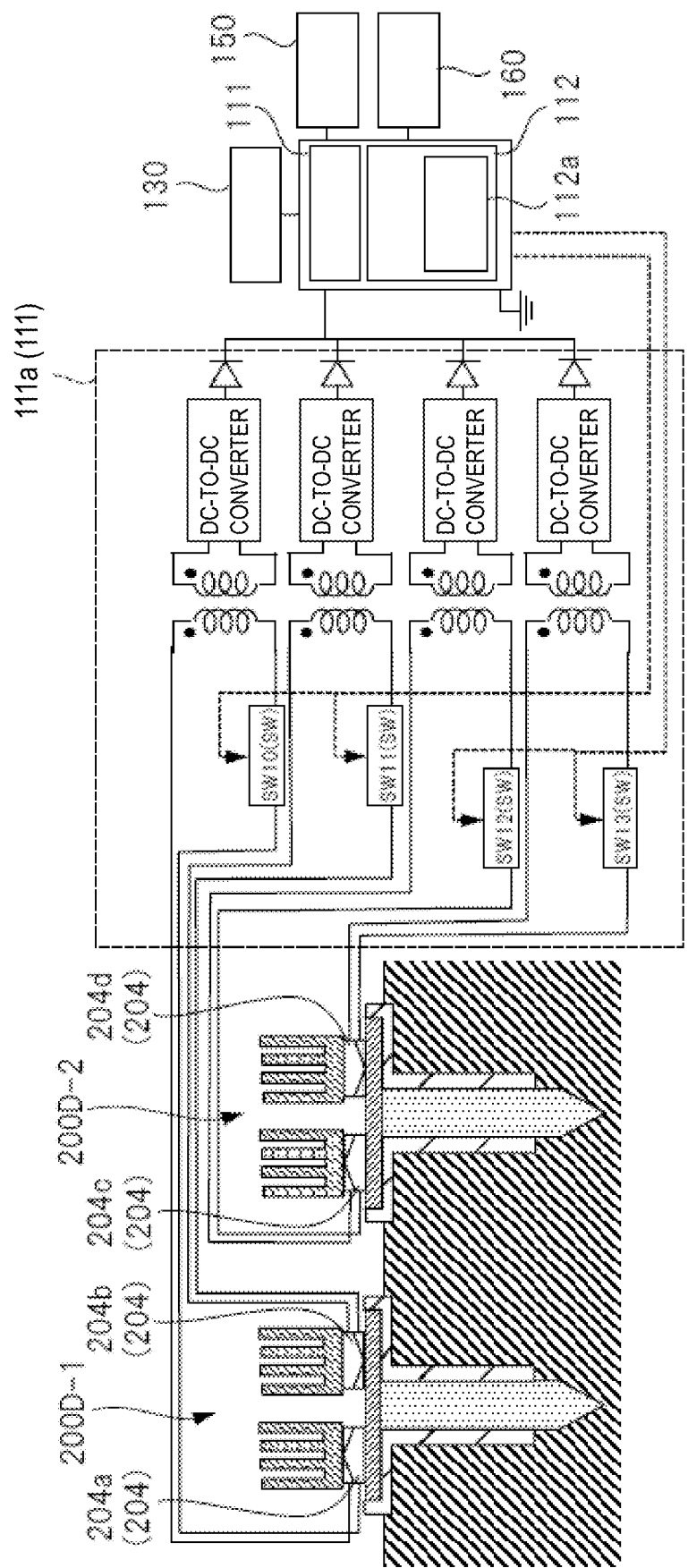
FIG. 28 is a diagram showing a temperature differential power generation module and an IoT edge module.

FIG. 28 is a diagram showing the temperature differential power generation module and the IoT edge module.

In FIG. 28, the temperature differential power generation module in this eighth modified example includes a temperature differential power generation module 200D-1 and a temperature differential power generation module 200D-2. The temperature differential power generation module 200D-1 and the temperature differential power generation module 200D-2 consist of the same type of the temperature differential power generation module. The temperature differential power generation module 200D-1 is provided with the temperature difference power generating element 204a and the temperature difference power generating element 204b which are opposite in the polarity to each other. Similarly, the temperature differential power generation module 200D-2 is provided with a temperature difference power generating element 204c and a temperature difference power generating element 204d which are opposite in the polarity to each other.

As shown in FIG. 28, the temperature difference power generating element 204a is connected to a switch SW10 for switching between energization and non-energization. The temperature difference power generating element 204b is connected to a switch SW11 for switching between energization and non-energization. Similarly, the temperature difference power generating element 204c is connected to a switch SW12 for switching energization and non-energization. The temperature difference power generating element 204d is connected to a switch SW13 for switching between energization and non-energization.

Each of the switch SW10 to switch SW13 is connected to a switch controller 112a of the microcomputer 112. And the switch controller 112a controls on or off of each of the switch SW10 to switch SW13. For example, the switch controller 112a is configured to control on or off of each of the switch SW10 to the switch SW13 based on the power generation status of the temperature differential power generation module 200D-1 and the power generation status of the temperature differential power generation module 200D-2. The switch controller 112 a may be configured to control on or off of each of the switch SW10 to switch SW13 based on temperature difference between the fin structure and the plate-shaped heat conductive material in the temperature differential power generation module 200D-1 and temperature difference between the fin structure and the plate-shaped heat conductive material in the temperature differential power generation module 200D-2.

Figure 29:
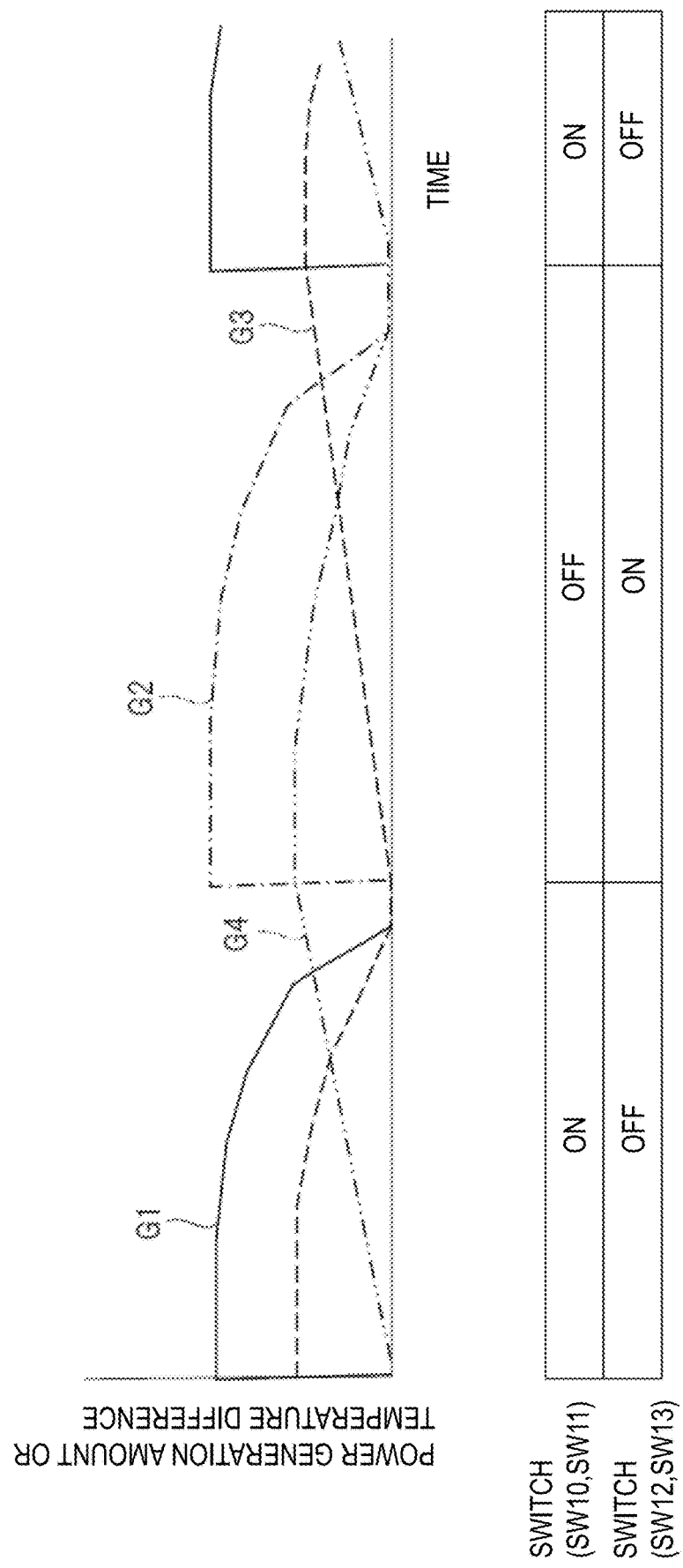
FIG. 29 is a graphical representation of a temporal variation of power generation amount and a temperature differences of a temperature differential power generation module.

FIG. 29 is a graphical representation of the time variation of the power generation amount and temperature differences, respectively, of the temperature differential power generation module 200D-1 and the time variation of the power generation amount and temperature differences, respectively, of the temperature differential power generation module 200D-2. Furthermore, FIG. 29 shows the on or off status of the switches SW10 to SW13. The vertical axis is the power generation amount or temperature difference. The horizontal axis is the time.

In FIG. 29, a graph "G1" is a graph showing the temporal change of the power generation amount of the temperature differential power generation module 200D-1. A graph "G2" is a graph showing the temporal change of the power generation amount of the temperature differential power generation module 200D-2. Further, a graph "G3" is a graph showing the temporal change of temperature differences between the finned structure and the plate-shaped heat conductive material in the temperature differential power generation module 200D-1. A graph "G4" is a graph showing the temporal variation of temperature differences between the fin-structure and the plate-shaped heat conductive material in the temperature differential power generation module 200D-2.

First, the switch controller 112 of the microcomputer 112 turns on the switch SW10 and the switch SW11, and turns off the switch SW12 and the switch SW13. As a result, power generation is started in the temperature differential power generation module 200D-1, while power generation in the temperature differential power generation module 200D-2 is stopped.

For the sake of simplicity, we assume that temperature of the fin-structure is higher than temperature on the plate-shaped heat conductive material. At this time, in the temperature differential power generation module 200D-1 generating electric power, a current flow through the temperature difference power generating element 204b, so that the number of charged carriers serving as a carrier of heat increases, and the thermal conductivity of the temperature difference power generating element 204b increases. Consequently, the heat transferred from the fin structure to the plate-shaped heat conductive material through the temperature difference power generating element 204b increases, and as the time passes, temperature difference between the fin structure and the plate-shaped heat conductive material decreases. This reduces power generation amount of the temperature differential power generation module 200D-1. On the other hand, in the temperature differential power generation module 200D-2 in which the power generation is stopped, since the current does not flow through the temperature difference power generating element 204d, the number of charged carriers serving as a carrier of heat decreases, and the thermal conductivity of the temperature difference power generating element 204d decreases. Thus, the heat transferred from the fin structure to the plate-shaped heat conductive material via the temperature difference power generating element 204b is reduced, thereby ensuring a temperature difference between the fin structure and the plate-shaped heat conductive material.

When the power generation status or the microcomputer 112 monitoring temperature difference detects that temperature difference becomes small in the temperature differential power generation module 200D-1 generating power and that the power generation amount is nearly zero, the switch controller 112a of the microcomputer 112 turns off the switch SW10 and the switch SW11, and turns on the switch SW12 and the switch SW13. As a result, the power generation by the temperature differential power generation module 200D-1, which has been generated up to now, is stopped. On the other hand, the power generation at the temperature differential power generation module 200D-2, which had been stopped until now, is started. Here, in the temperature differential power generation module 200D-2, where power generation has been stopped until now, a large power generation amount can be obtained because temperature differences between the fin structures and the plate-shaped heat conductive material are ensured. On the other hand, in the temperature differential power generation module 200D-1 which has been generating electricity, the difference in temperature between the fin structure and the plate-shaped heat conductive material is small, but by turning off the switch SW10 and the switch SW11 and stopping the power generation, the charge carriers which are the carriers of heat are reduced, and the thermal conductivity of the temperature difference power generating element 204d is reduced. As a result, temperature differences between the fin structures and the plate-shaped heat conductive material are gradually restored. By repeating such an operation, according to the temperature differential power generation module including combinations of the temperature differential power generation module 200D-1 and the temperature differential power generation module 200D-2, it is possible to improve power generation efficiencies.

Thus, the basic philosophy in this eighth modified example is embodied in a configuration in which switch is provided in the IoT edge module to forcibly stop the power generation of one of the two temperature differential power generation module. In this configuration, for example, the microcomputer detects when temperature differential between the fin-structure of the temperature differential power generation module and the plate-shaped heat conductive material during power generation becomes small and the power cannot be generated, and switch is switched complementarily. This ensures that the other the temperature differential power generation module, which had previously stopped generating electricity, can resume generating electricity because temperature differences between the fin-structure and the plate-shaped heat conductive material are ensured. Consequently, according to this eighth modified example, it is possible to improve the power generation efficiency at the temperature differential power generation module.

Also, if you prepare two of the same type of the temperature differential power generation module, it is possible to configure eighth modified example, the temperature differential power generation module, there is no need to prepare two types of heat conductive material differently as described in seventh modified example. Consequently, according to the present eighth modified example, it is possible to obtain an advantage that labor such as procurement of members and data-checking of power generation properties is reduced by half.

The invention made by the present inventor has been described above in detail based on the embodiment, but the present invention is not limited to the embodiment described above, and it is needless to say that various modifications can be made without departing from the gist thereof.

The embodiment includes the following modes.

(Additional Statement 1)

A IoT edge module, comprising a microcomputer configured to control a supply of a power from a temperature differential power generation module to a wireless communication module and a sensor, wherein the microcomputer includes transistors formed in a SOTB substrate, wherein the microcomputer is configured to determine a power supply operation to the wireless communication module and the sensor based on a power generation status of the temperature differential power generation module.

(Additional Statement 2)

The IoT edge module according to additional statement 1, wherein the IoT edge module includes a power supply circuit interposed between the temperature differential power generation module and the microcomputer.

(Additional Statement 3)

The IoT edge module according to additional statement 2, wherein the temperature differential power generation module includes:

a heat conductive material; a coating material with lower thermal conductivity than the heat conductive material, and covering the heat conductive material;

a distal end of the heat conductive material exposed from the coating material;

a plate-shaped heat conductive material contacting the heat conductive material, a first temperature difference power generating element provided on the plate-shaped heat conductive material; a second temperature difference power generating element provided on the plate-shaped heat conductive material, and which polarity is opposite from the first temperature difference power generating element;

a first fin structure in contact with the first temperature difference power generating element; and a second fin structure in contact with the second temperature difference power generating element, wherein the power supply circuit comprising:

a first booster circuit electrically connected to the first temperature difference power generating element;

a first backflow prevention diode electrically connected to the first booster circuit;

a second booster circuit electrically connected to the second temperature difference power generating element; and a second backflow prevention diode electrically connected to the second booster circuit.

(Additional Statement 4)

The IoT edge module according to additional statement 2, wherein the temperature differential power generation module includes:

a first temperature differential power generation module with a first heat conductive material; and a second temperature differential power generation module with a second heat conductive material, wherein the first heat conductive material and second heat conductive material differ in thermal conductivity or heat capacity from each other.

(Additional Statement 5)

The IoT edge module according to additional statement 2, wherein the temperature differential power generation module includes:

a first temperature differential power generation module; and a second temperature differential power generation module, wherein the power supply circuit includes:

a first switch connected to the first temperature differential power generation module;

a first booster circuit connected to the first switch;

a first backflow prevention diode connected to the first booster circuit;

a second switch connected to the second temperature differential power generation module;

a second booster circuit connected to the second switch; and a second backflow prevention diode connected to the second booster circuit, wherein the microcomputer includes a switch controller configured to control on or off of the first switch and the second switch.

(Additional Statement 6)

The IoT edge module according to additional statement 5, wherein the switch controller is configured to control on or off of the first switch and the second first based on the power generation status of the temperature differential power generation module and the power generation status of the second temperature differential power generation module.

What is claimed is:

1. A IoT edge module, comprising:
a microcomputer configured to control a supply of power from a temperature differential power generation module to a wireless communication module and a sensor,
wherein the microcomputer includes transistors formed in a SOTB substrate,
wherein the microcomputer is configured to determine a power supply operation to the wireless communication module and the sensor, based on a power generation status of the temperature differential power generation module,
wherein the microcomputer executes the power supply operation to the wireless communication module at a first time interval based on a power generation amount on a day with a least power generation amount at the temperature differential power generation module,
wherein the microcomputer executes the power supply operation to the sensor at a second time interval based on the power generation amount on the day with the least power generation amount at the temperature differential power generation module,
wherein the temperature differential power generation module generates the power based on a temperature differences between a temperature of an atmosphere on a ground surface and a soil temperature, and
wherein the microcomputer comprising:
  a temperature data acquisition circuit configured to acquire hourly temperature data throughout a year for each of the atmosphere on the ground surface and the soil;
  a power generation amount calculating circuit configured to calculate a daily power generation amount of the temperature differential power generation module throughout the year based on the temperature data acquired in the temperature data acquisition circuit;
  a minimum power generation date specifying circuit configured to identify a date with a least power generation amount based on the power generation amount calculated in the power generation amount calculating circuit;
  a time interval calculating circuit configured to calculate the first time interval for stable operation of the wireless communication module, and to calculate the second time interval for stable operation of the sensor based on the power generation amount of the date specified in the minimum power generation date specifying circuit; and
  a power supply controller configured to perform the power supply operation to the wireless communication module in the first time interval calculated by the time interval calculating circuit, and to perform the power supply operation to the sensor in the second time interval calculated by the time interval calculating circuit.

2. The IoT edge module according to claim 1, further comprising:
  a power storage device to store the power generated by the temperature differential power generation module and to provide the power to the wireless communication module and the sensor,
  wherein the microcomputer determines the power supply operation to the wireless communication module and the sensor based on a combination of the power generation status of the temperature differential power generation module and a power storage state of the power storage device.

3. The IoT edge module according to claim 1, wherein the first time interval is longer than the second time interval.

4. The IoT edge module according to claim 1, wherein the first time interval and the second time interval are substantially same.

5. The IoT edge module according to claim 1,
  wherein the temperature data acquisition circuit is configured to acquire a semi-monthly temperature data basis throughout the year for each of the atmosphere on the ground surface and the soil, and
  wherein the power generation amount calculating circuit is configured to extract a plurality of days based on the semi-monthly temperature data basis throughout the year for each of the atmosphere on the ground surface and the soil, and to calculate a daily power generation amount of the temperature differential power generation module of each of the plurality of extracted days based on the hourly temperature data throughout the year for each of the atmosphere on the ground surface and the soil temperature.

6. The IoT edge module according to claim 1,
  wherein the time interval calculating circuit is configured to calculate the first time interval for stably operating the wireless communication module and the second time interval for stably operating the sensor using an artificial intelligence.

7. The IoT edge module according to claim 1,
  wherein the IoT edge module is configured to be connectable to a data center via the wireless communication module, and
  wherein the temperature data acquired by the temperature data acquisition circuit is data provided in advance from the data center.

8. The IoT edge module according to claim 1,
  wherein the IoT edge module is configured to be connectable to a data center via the wireless communication module,
  wherein the data center comprising:
  a temperature data acquisition circuit configured to acquire hourly temperature data throughout the year for each of the atmosphere on the ground surface and the soil,
  a power generation amount calculating circuit configured to calculate a daily power generation amount of the temperature differential power generation module throughout the year based on the temperature data acquired in the temperature data acquisition circuit,
  a minimum power generation date specifying circuit configured to identify a date with a least power generation amount based on the power generation amount calculated in the power generation amount calculating circuit,
  a time interval calculating circuit configured to calculate the first time interval for stable operation of the wireless communication module and the second time interval for stable operation of the sensor based on the power generation amount of the date specified in the minimum power generation date specifying circuit, and
  a time interval output circuit configured to output the first time interval and the second time interval calculated by the time interval calculating circuit to the microcomputer,
  wherein the microcomputer comprises:
  a time interval input circuit configured to receive the first time interval and the second time interval outputted from the time interval output circuit, and
  a power supply controller configured to perform the power supply operation to the wireless communication module with the first time interval input to the time interval input circuit and to perform the power supply operation to the sensor with the second time interval input to the time interval input circuit.

9. The IoT edge module according to claim 1,
  wherein the IoT edge module is configured to be connectable to a data center via the wireless communication module,
  wherein the microcomputer is electrically connectable to a power storage capacitor configured to provide the power to the microcomputer and to store the power generated by the temperature differential power generation module,
  wherein the microcomputer includes a voltage output circuit configured to output data relating to the voltage value of the power storage capacitor to the data center, wherein the data center comprises:
a voltage input circuit configured to input the data relating to a voltage value output from the voltage output circuit,
an estimated power generation amount calculation circuit configured to calculate estimated the power generation amount of the temperature differential power generation module daily throughout the year based on the data relating to the voltage value input to the voltage input circuit,
a minimum power generation date specifying circuit configured to identify a day with a least power generation amount based on estimated the power generation amount calculated in the estimated power generation amount calculation circuit,
a time interval calculating circuit configured to calculate the first time interval for stable operation of the wireless communication module and the second time interval for stable operation of the sensor based on the estimated the power generation amount of the date specified in the minimum power generation date specifying circuit, and
a time interval output circuit configured to output the first time interval and the second time interval calculated by time interval calculating circuit to the microcomputer,
wherein the microcomputer comprises:
a time interval input circuit configured to receive the first time interval and the second time interval outputted from time interval output circuit, and
a power supply controller configured to perform the power supply operation to the wireless communication module with the first time interval input to the time interval input circuit and to perform the power supply operation to the sensor with the second time interval input to time interval input circuit.

10. The IoT edge module according to claim 1, wherein the temperature differential power generation module comprises:
a heat conductive material;
a coating material with lower thermal conductivity than the heat conductive material, and covering the heat conductive material;
a distal end of the heat conductive material exposed from the coating material; and
a temperature difference power generating element contacting an opposite end of the distal end of the heat conductive material.

11. The IoT edge module according to claim 10, wherein the temperature difference power generating element is a seebeck element.

12. The IoT edge module according to claim 1, wherein the temperature differential power generation module comprises:
a first temperature difference power generating element; and
a second temperature difference power generating element which polarity is opposite from the first temperature difference power generating element.

13. The IoT edge module according to claim 1, wherein the sensor includes at least one of a temperature sensor, a humidity sensor, a soil moisture sensor, a pH sensor, or a thermal conductivity measurement sensor.

14. An IoT edge module which is a component of a smart agricultural system, the IoT edge module comprising:
a microcomputer controlling a supply of power from a temperature differential power generation module to a wireless communication module and a sensor,
wherein the smart agricultural system presents a growth condition of crops at a location of the IoT edge module based on outputs from the IoT edge module,
wherein the microcomputer includes transistors formed in a SOTB substrate,
wherein the microcomputer is configured to determine a power supply operation to the wireless communication module and the sensor based on a power generation status of the temperature differential power generation module,
wherein the microcomputer executes the power supply operation to the wireless communication module at a first time interval based on a power generation amount on a day with a least power generation amount at the temperature differential power generation module,
wherein the microcomputer executes the power supply operation to the sensor at a second time interval based on the power generation amount on the day with the least power generation amount at the temperature differential power generation module,
wherein the temperature differential power generation module generates the power based on a temperature differences between a temperature of an atmosphere on a ground surface and a soil temperature, and
wherein the microcomputer comprising:
a temperature data acquisition circuit configured to acquire hourly temperature data throughout a year for each of the atmosphere on the ground surface and the soil;
a power generation amount calculating circuit configured to calculate a daily power generation amount of the temperature differential power generation module throughout the year based on the temperature data acquired in the temperature data acquisition circuit;
a minimum power generation date specifying circuit configured to identify a date with a least power generation amount based on the power generation amount calculated in the power generation amount calculating circuit;
a time interval calculating circuit configured to calculate the first time interval for stable operation of the wireless communication module, and to calculate the second time interval for stable operation of the sensor based on the power generation amount of the date specified in the minimum power generation date specifying circuit; and
a power supply controller configured to perform the power supply operation to the wireless communication module in the first time interval calculated by the time interval calculating circuit, and to perform the power supply operation to the sensor in the second time interval calculated by the time interval calculating circuit.

* * * * *